(12) United States Patent  
Shaffer

(10) Patent No.: US 8,021,445 B2  
(45) Date of Patent: Sep. 20, 2011

(54) UPGRADING CARBONACEOUS MATERIALS

(75) Inventor: David B. Shaffer, Thornton, PA (US)

(73) Assignee: Skye Energy Holdings, Inc., Santa Cruz, CA (US)

( * ) Notice: Subject to any disclaimer, the term of this patent is extended or adjusted under 35 U.S.C. 154(b) by 446 days.

(21) Appl. No.: 12/169,913

(22) Filed: Jul. 9, 2008

(65) Prior Publication Data

US 2010/0005710 A1    Jan. 14, 2010

(51) Int. Cl.
F26B 3/04 (2006.01)
F26B 21/10 (2006.01)
C10L 9/08 (2006.01)

(52) U.S. Cl. ............... 44/626; 44/594; 34/413; 34/415; 34/405

(58) Field of Classification Search .......... 44/594, 44/626; 34/405, 413, 415
See application file for complete search history.

(56) References Cited

U.S. PATENT DOCUMENTS

| | | | |
|---|---|---|---|
| 1,679,078 A | 7/1928 | Fleissner | |
| 3,754,876 A * | 8/1973 | Pennington et al. | 44/607 |
| 4,018,571 A * | 4/1977 | Cole et al. | 44/574 |
| 4,052,168 A | 10/1977 | Koppelman | |
| 4,059,415 A | 11/1977 | Kosaka et al. | |
| 4,069,107 A | 1/1978 | Koppelman et al. | |
| 4,082,357 A | 4/1978 | Schmidt et al. | |
| 4,082,498 A * | 4/1978 | Offergeld et al. | 432/14 |
| 4,084,938 A * | 4/1978 | Willard, Sr. | 424/125 |
| 4,106,812 A | 8/1978 | Clark | |
| 4,106,999 A | 8/1978 | Koppelman et al. | |
| 4,126,519 A * | 11/1978 | Murray | 201/32 |
| 4,127,391 A | 11/1978 | Koppelman | |
| 4,129,420 A | 12/1978 | Koppelman | |
| 4,220,458 A | 9/1980 | Koppelman et al. | |
| 4,236,459 A | 12/1980 | Teoli | |
| 4,259,560 A * | 3/1981 | Rhodes | 219/678 |
| 4,286,523 A | 9/1981 | Densmore | |
| 4,290,269 A * | 9/1981 | Hedstrom et al. | 60/670 |
| 4,330,032 A | 5/1982 | Koppelman et al. | |
| 4,339,306 A | 7/1982 | Janusch | |
| 4,343,240 A | 8/1982 | Nishimura | |
| 4,361,097 A | 11/1982 | Jones et al. | |
| 4,393,785 A | 7/1983 | Hörtnagel | |
| 4,408,542 A | 10/1983 | Heap | |
| 4,471,536 A | 9/1984 | Herber et al. | |
| 4,472,885 A | 9/1984 | Nakabayashi et al. | |
| 4,477,257 A | 10/1984 | Koppelman et al. | |
| 4,486,959 A | 12/1984 | Chang | |
| 4,497,259 A | 2/1985 | Titterton | |
| 4,502,227 A | 3/1985 | Janusch | |
| 4,507,174 A | 3/1985 | Kutrieb | |
| 4,514,910 A | 5/1985 | Elmore et al. | |
| 4,514,912 A | 5/1985 | Janusch et al. | |
| 4,531,460 A | 7/1985 | Pamer | |

(Continued)

OTHER PUBLICATIONS

Grimes, R.W. et al., "Preparation For Upgrading Western Sub-bituminous Coal," Topical Report, DOE/MC/11076-3049, DE92 001130, Nov. 1990, 81 pages.

(Continued)

*Primary Examiner* — Cephia D. Toomer
*Assistant Examiner* — Pamela Weiss
(74) *Attorney, Agent, or Firm* — Woodcock Washburn LLP

(57) ABSTRACT

Disclosed are methods for upgrading carbonaceous materials. Also disclosed are apparatuses for upgrading carbonaceous materials. Also disclosed are systems for upgrading carbonaceous materials. Also disclosed are upgraded carbonaceous materials.

58 Claims, 11 Drawing Sheets

U.S. PATENT DOCUMENTS

| | | | |
|---|---|---|---|
| 4,561,359 A | 12/1985 | Duce | |
| 4,579,562 A | 4/1986 | Tarman et al. | |
| 4,589,348 A | 5/1986 | Holabeck et al. | |
| 4,626,258 A | 12/1986 | Koppelman | |
| 4,667,416 A | 5/1987 | Hacker et al. | |
| 4,674,195 A | 6/1987 | Janusch | |
| 4,725,337 A | 2/1988 | Greene | |
| 4,728,339 A | 3/1988 | Koppelman | |
| 4,733,478 A | 3/1988 | Kamei et al. | |
| 4,769,042 A | 9/1988 | Ito et al. | |
| 4,810,258 A | 3/1989 | Greene | |
| 4,911,082 A | 3/1990 | Richmond | |
| 4,955,989 A | 9/1990 | Mink | |
| 4,974,520 A | 12/1990 | Dehne | |
| 5,000,099 A | 3/1991 | Dickinson | |
| 5,048,426 A | 9/1991 | Burt et al. | |
| 5,071,447 A | 12/1991 | Koppelman | |
| 5,290,523 A | 3/1994 | Koppelman | |
| 5,294,412 A | 3/1994 | Orlando | |
| 5,322,530 A | 6/1994 | Merriam et al. | |
| 5,354,345 A | 10/1994 | Nehls, Jr. | |
| 5,395,404 A | 3/1995 | Burckhalter | |
| 5,424,046 A | 6/1995 | Smith et al. | |
| 5,527,365 A | 6/1996 | Coleman et al. | |
| 5,568,770 A | 10/1996 | Ito et al. | |
| 5,656,041 A | 8/1997 | Hylton | |
| 5,746,787 A | 5/1998 | Koppelman | |
| 5,769,908 A | 6/1998 | Koppelman | |
| 5,983,804 A | 11/1999 | Jespersen | |
| 6,053,954 A | 4/2000 | Anderson et al. | |
| 6,146,432 A | 11/2000 | Ochs et al. | |
| 6,185,841 B1 | 2/2001 | Conochie | |
| 6,249,989 B1 | 6/2001 | Conochie et al. | |
| 6,266,894 B1 | 7/2001 | Conochie | |
| 6,473,994 B1 | 11/2002 | Dedieu et al. | |
| 6,497,054 B2 * | 12/2002 | Davies et al. | 34/413 |
| 6,497,737 B1 | 12/2002 | Conochie et al. | |
| 6,506,224 B1 | 1/2003 | Conochie | |
| 6,516,728 B1 | 2/2003 | Müller et al. | |
| 6,664,302 B2 | 12/2003 | French et al. | |
| 6,878,174 B1 | 4/2005 | Conochie | |
| 7,107,911 B2 | 9/2006 | Suh | |
| 7,128,767 B2 | 10/2006 | French et al. | |
| 7,198,655 B2 | 4/2007 | Hogsett et al. | |
| 2002/0079273 A1 | 6/2002 | Davies et al. | |
| 2005/0050759 A1 * | 3/2005 | Chandran et al. | 34/576 |
| 2005/0241217 A1 * | 11/2005 | Hogsett et al. | 44/620 |
| 2006/0075682 A1 | 4/2006 | Bullinger et al. | |
| 2006/0107587 A1 | 5/2006 | Bullinger et al. | |
| 2006/0248791 A1 | 11/2006 | Hogsett et al. | |
| 2008/0202985 A1 * | 8/2008 | Hatfield et al. | 208/403 |

OTHER PUBLICATIONS

Comprehensive Report to Congress Clean Coal Technology Program, Advanced Coal Conversion Process Demonstration, DOE/FE-0192P, Jul. 1990, 27 pages.

Merriam, N.W., "Upgrading Low Rank Coal Using the Koppelman Series C Process," Paper No. DOE/MC/30127-98/C0943, Advanced Coal-Based Power and Environmental Systems '97 Conference, Jul. 22-24, 1997, Pittsburgh, Pennsylvania, 15 pages.

* cited by examiner

UPGRADING CARBONACEOUS MATERIALS

FIELD OF THE INVENTION

The disclosed invention is in the field of upgrading carbonaceous materials. The disclosed invention is also in the field of apparatuses for upgrading carbonaceous materials. The disclosed invention is also in the field of carbonaceous materials, e.g., coal, and upgrading their quality.

BACKGROUND OF THE INVENTION

The world's growing energy needs require the use of various carbonaceous materials, especially those that have previously been considered less suitable for use as fuel. Many carbonaceous materials are less suitable for use as fuel because their moisture contents are very high. Combusting carbonaceous materials with high moisture contents imposes a penalty on heating efficiency, because of the additional energy required to vaporize the moisture during combustion, and because of the additional equipment costs necessary to handle the additional water vapor. High moisture content also necessitates non-optimal operating conditions in combustion facilities to avoid the formation of corrosive sulfuric acid in flue gas. Moist carbonaceous materials are also susceptible to freezing in cold climates, increasing the difficulty of handling and transportation. In addition, high moisture content increases transportation costs, because when moving an amount of carbonaceous material representing a certain heating value, any moisture retained in the material adds weight but not heating value.

As but one example of the general problem of high moisture in carbonaceous materials, consider the extensive deposits of subbituminous coal in the western United States. This coal is not widely relied upon in the eastern United States, despite its useful low sulfur content, because the western subbitumunous coal retains significant amounts of moisture, ranging from 20 percent to 50 percent. The high moisture content of western subbitumunous coal contributes significantly to the overall cost of the coal to eastern purchasers, because transportation costs represent the majority of the cost of western coal to an eastern coal purchaser. Furthermore, existing eastern coal consumers are inhibited from switching to western coal because the eastern combustion equipment often cannot be economically adapted to accommodate the moist western coal. Different aspects of the same general problem arise in the combustion and other uses of bituminous coals, lignite, peat, biomass, and other carbonaceous materials. Accordingly, there is a history of attempts to upgrade carbonaceous materials by lowering the moisture content of the materials.

Attempts to lower the moisture content of carbonaceous materials can be traced back at least to U.S. Pat. No. 1,679,078 to Fleissner. More recent derivatives of the Fleissner process are represented, for example, in U.S. Pat. No. 4,514,912 to Janusch. Fleissner described the treatment of brown coal, also known as lignite, with steam at certain temperatures and pressures. Fleissner describes placing the lignite in an autoclave, and driving off moisture from the lignite by heating it with steam under superatmospheric pressure, and then depressurizing the autoclave. The carbonaceous material product of the Fleissner process, while having a lowered moisture content at first, is hygroscopic, and will rapidly become moist once exposed to atmospheric moisture. The product of the Fleissner product also tends to create dust and be susceptible to spontaneous combustion, two significant problems in coal handling. Furthermore, the Fleissner process is not economically attractive due to low energy efficiency.

Accordingly, it is desirable to provide energy-efficient methods, systems, and apparatuses for upgrading carbonaceous materials. It is also desirable to provide carbonaceous materials that not only have decreased moisture and impurity contents, but also have stability to atmospheric moisture, decreased dustiness, and reduced likelihood of spontaneous combustion.

SUMMARY OF THE INVENTION

In meeting the described challenges, methods are disclosed herein including reducing the water content in a carbonaceous material by heating the carbonaceous material with steam at superatmospheric pressure, and cooling the carbonaceous material with water while controlling the pressure of the carbonaceous material at superatmospheric pressure.

Systems are disclosed herein including a processor for reducing the water content in a carbonaceous material, and a tank, connected to the processor, for storing fluids, and for transmitting fluids to and from the processor.

Systems are disclosed herein including a processor for reducing the water content in a carbonaceous material, and a railed conveyance for moving the carbonaceous material into and out of the processor.

Methods are disclosed herein including providing carbonaceous material surrounded by an atmosphere at a first pressure, contacting the carbonaceous material with steam, wherein the steam has a first temperature and a second pressure greater than the first pressure, for a first time sufficient to reduce the weight percentage of a constituent of the carbonaceous material, contacting the carbonaceous material with liquid water for a second time sufficient to reduce the temperature of the atmosphere surrounding the carbonaceous material to a second temperature, contacting the carbonaceous material with a gas, other than steam, sufficient in quantity to maintain the pressure of the atmosphere surrounding the carbonaceous material at a third pressure, greater than the first pressure, until at least the end of the second time, reducing the pressure of the atmosphere surrounding the carbonaceous material to at most the first pressure.

Methods are disclosed herein including providing carbonaceous material surrounded by an atmosphere at a first pressure, contacting the carbonaceous material with a gas sufficient in quantity to maintain the pressure of the atmosphere surrounding the carbonaceous material at a second pressure greater than the first pressure, irradiating the carbonaceous material with microwave radiation for a first time sufficient to reduce the weight percentage of water in the carbonaceous material, thereby heating the atmosphere surrounding the carbonaceous material to a first temperature, cooling the carbonaceous material for a second time sufficient to reduce the temperature of the atmosphere surrounding the carbonaceous material to a second temperature less than about 200° F., reducing the pressure of the atmosphere surrounding the carbonaceous material to at most the first pressure.

Apparatuses are disclosed herein including a vessel capable of withstanding superatmospheric internal pressure, a railed conveyance for moving a carbonaceous material into and out of the vessel, a first hatch in the vessel through which the railed conveyance may pass.

Apparatuses are disclosed herein including comprising a rail, a head adapted to move along the rail, a structural member comprising an upper end and a lower end, wherein the upper end is affixed to the head, a structural frame affixed to the lower end of the structural member, and a surface supported by the structural frame, wherein the surface is interchangeable.

Also disclosed are compositions made according to the methods disclosed herein.

The general description and the following detailed description are exemplary and explanatory only and are not restrictive of the invention, as defined in the appended claims. Other aspects of the present invention can be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1:
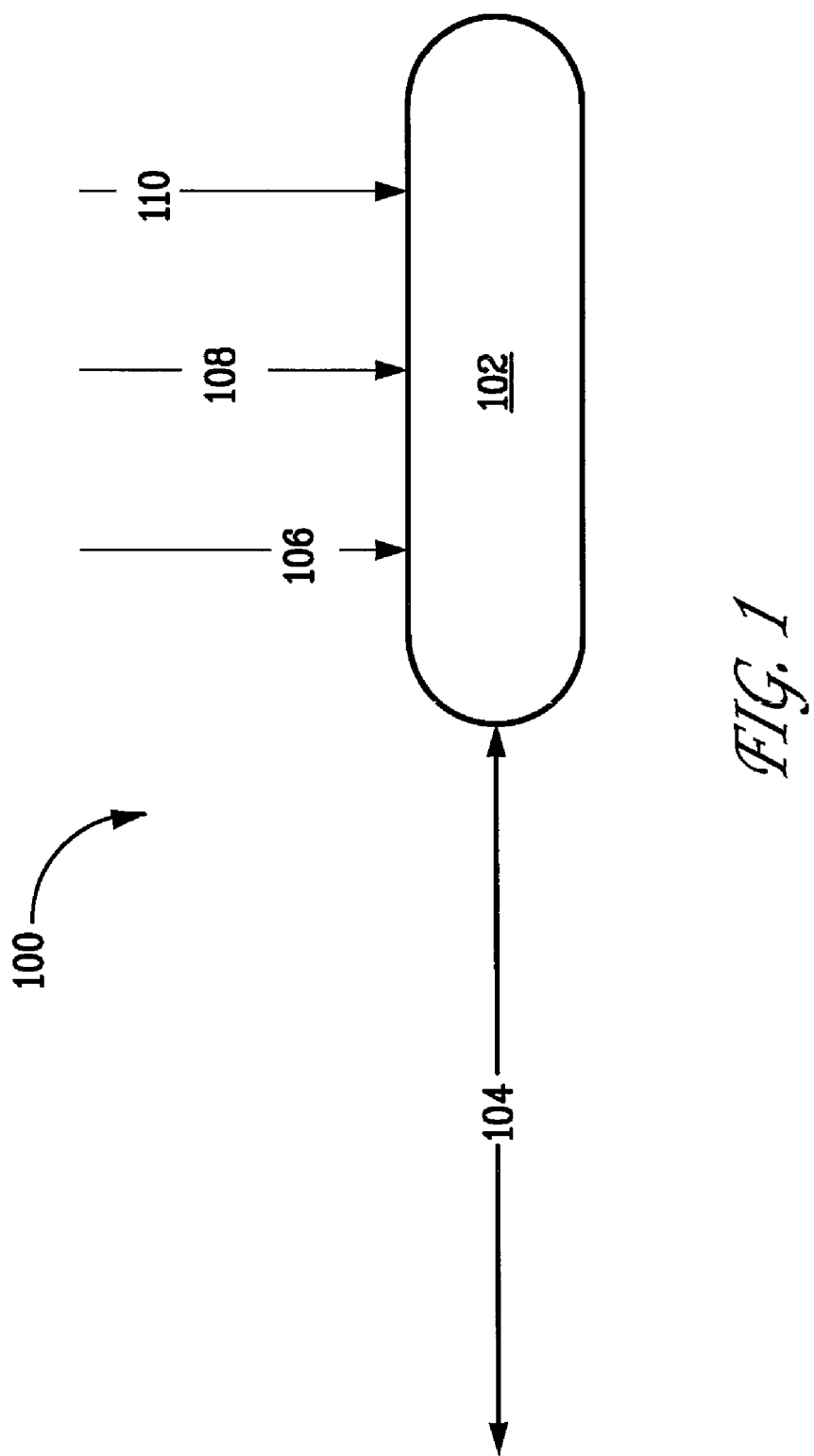
FIG. 1 depicts an embodiment of a system for upgrading carbonaceous material including but not limited to a processor.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

Methods

In several methods disclosed herein, the water content of a carbonaceous material is reduced by heating the carbonaceous material with steam at superatmospheric pressure, and then cooling the carbonaceous material with water while controlling the pressure of the carbonaceous material at superatmospheric pressure. At least one way to accomplish this is by placing the carbonaceous material in a vessel, and then pressurizing the vessel with steam. While exposed to the heat and pressure of the steam, the water content of the carbonaceous material will decrease. After the water content of the carbonaceous material has been reduced by a desired amount, the carbonaceous material may then be cooled.

For example, the cooling may be accomplished by showering, washing, spraying, or otherwise contacting the carbonaceous material with a liquid comprising water. The introduction of relatively cool liquid water into the vessel may quickly cause the steam present in the vessel to condense, and therefore reduce the pressure in the vessel to atmospheric pressure. Alternatively, cooling may be accomplished by decompression, for example by opening the vessel to the atmosphere, wherein the pressure will decrease rapidly. In several methods disclosed herein, this rapid pressure reduction may be prevented by controlling the pressure in the vessel. The pressure may be controlled to vary in numerous ways, for example to stay relatively constant during the cooling process. Superatmospheric pressure is a pressure of greater than 1 atmosphere, or equivalently, zero psig.

In several methods disclosed herein, the cooling may begin after removing some, much, or all of the heating medium from around the carbonaceous material. For example, where the heating medium is a pressurized gas, the gas may be vented from a vessel surrounding the carbonaceous material. For example, the gas may be vented from a vessel surrounding the carbonaceous material and thereafter provided to an energy recovery tank. In a further example, the heating medium may be steam. Instead of cooling with liquid water immediately upon the conclusion of the heating, the steam may, for example, be vented. The steam may be vented slightly, partially, substantially, or fully. The steam may be replaced by a pressurized gas other than steam, such as air, during the venting, so as to control the pressure. Following the venting and replacement of steam, the cooling may be accomplished with water.

By maintaining the pressure above atmospheric pressure during cooling, several methods disclosed herein thus cool the carbonaceous material under pressure. Another example of controlling the pressure during cooling is to allow the pressure to fall during cooling, but to control the decrease so it occurs gradually instead of rapidly. Yet another alternative method of control is to include at least one period of holding the pressure essentially unchanged in combination with periods of gradual decrease either preceding or following the first period, or both. The pressure may also be increased during periods of cooling, including increasing the pressure above the highest pressure at which the carbonaceous material was heated with superatmospheric steam. Further variations of pressure during the cooling process are also contemplated, the choice of which may depend on the particular goals of the upgrading process and the selected carbonaceous material.

The act of contacting the carbonaceous material with water does not contradict the purpose of certain methods where one object is to reduce the water content of the carbonaceous material. This is because the step of heating with steam at superatmospheric pressure forces water from the interior of the carbonaceous material to the exterior of the carbonaceous material, where it can be dried by any conventional drying means, including but not limited to centrifugation, blowing with warm or dry air, and simply allowing the carbonaceous to dry in the atmosphere. Thus, additional water on the surface of the carbonaceous material is not problematic, since the interior of the carbonaceous material will nonetheless have a lower water content than it did prior to treatment by these methods, and this additional surface water can also be dried by means already discussed.

In several of the methods disclosed herein, while heating with steam at superatmospheric pressure, other constituents are forced from the interior of the carbonaceous material along with the water, for example, sulfur, mercury, sodium, chlorides, and arsenic. These constituents may be washed away during the step of cooling with water. As a result of this process, constituents other than water may be removed from the carbonaceous material. Removing certain constituents may be advantageous, where, for example, these constituents ultimately contribute to pollution when the carbonaceous material is combusted. Sulfur, mercury, sodium, chlorides, and arsenic are examples of constituents of carbonaceous materials that contribute to pollution or wear and tear on further processing equipment.

Prior to heating with steam at superatmospheric pressure, the carbonaceous material may be pre-heated. A pre-heating step may in some instances provide additional efficiency, for example by allowing the re-use of warm process water. The carbonaceous material may also be pre-heated by exposure to a warm environment, a warm fluid, or radiation such as microwave radiation, generated, for example, by klystron tubes. Pre-heating is an additional element that may be combined with any other combination of steps and features disclosed herein.

As one example of how to pre-heat the carbonaceous material, it may be sprayed, washed, showered, submerged in, or otherwise contacted with a liquid. This may be accomplished in a wet jig. An example of a wet jig is an apparatus that allows the carbonaceous material to be sorted or separated by the size of the physical particles, and in the process the carbonaceous material is wetted.

As a further example of how to pre-heat the carbonaceous material, it may be exposed to steam. This may be advantageous, for example, where lower-quality process steam may be recycled to pre-heat the carbonaceous material. Pre-heating with steam may be accomplished in a vessel, a wet jig, or other unit process capable of handling carbonaceous material and steam.

A still further example of how to pre-heat the carbonaceous material is to expose the carbonaceous material to a warm gas, such as air. The exposure to air may occur in a variety of process units, including but not limited to an air jig, where the coal may be sorted and sized, as well as preheated by warm air.

Where the pre-heating is accomplished with a liquid, the liquid may comprise water, aqueous solutions, or hydrocarbons including liquid petroleum products. For example, recycled process water may include various constituents acquired during whatever process steps in which the water had previously been used. Alternatively, constituents may be added to the water for pre-heating for purposeful effect. For example, hydrogen peroxide may be added to the water for pre-heating.

The carbonaceous materials disclosed herein may comprise, for example, any material that is combustible or may be upgraded to become combustible by means disclosed herein or other upgrading processes. The carbonaceous materials may also include any material comprising carbon susceptible to upgrading. The carbonaceous materials may also comprise mixtures of any individual carbonaceous materials, including but not limited to the carbonaceous materials disclosed herein, or mixtures of carbonaceous materials and any other material. In several aspects disclosed herein, the carbonaceous material may be coal. Any form of coal may be suitable for upgrading, including coal that has been pre-treated by any technique such as dewatering, sizing, or washing.

Several examples of carbonaceous materials comprising coal suitable for use as disclosed herein include bituminous coal, subbituminous coal, lignite, peat and anthracite, or other coals of any rank. Coal is a fossil fuel that generally follows a progression from lower rank to higher rank as it forms naturally. These coals have varying levels of volatile materials, moisture, fixed carbon, heating values, and the like. Peat, which may also be considered a precursor to coal, is a solid agglomeration of partially decayed organic matter. It may be obtained in mires, swamps or other suitable wetlands. It may be processed in a variety of ways prior to upgrading by methods disclosed herein, including compaction and dewatering.

Lignite is a lower rank coal, sometimes known as brown coal. Lignite may have a moisture content as high as 70 percent, and likewise has a relatively high ash content. Thus, the heating value of lignite is lower than coals of higher rank. Because of its low heating value, lignite is often economically disadvantageous as a fuel source, especially if it must be transported before combustion.

Bituminous coal is a higher rank coal, having a moisture content in a range around 20 percent. Bituminous coal is dense and soft, and may comprise various levels of sulfur and other constituents, depending on the source of the coal.

Subbituminous coal is coal of a rank between lignite and bituminous coal. Subbituminous coal is particularly common in the United States, especially in the Western United States, where demonstrated reserves are thought to represent several hundred billion tons of coal. Subbituminous coal may be sourced from, for example, the Powder River Coal Basin. Coal from this region may have a moisture content ranging from about 20 percent to about 50 percent, representing moisture levels that significantly burden combustion equipment.

Anthracite is a higher rank coal, having among its properties a high proportion of carbon, high hardness, lower moisture content, and a susceptibility to dusting.

In further aspects disclosed herein, the carbonaceous material may comprise biomass comprising any variety of biomass sources, as well as combinations thereof. Suitable sources of biomass feedstock may include plant matter, animal matter, sea matter, organic waste, and other materials of biological origin. Examples of plant matter may include wood, leaves, grasses, waste paper, energy crops, tree trimmings, waste plant matter used in food production such as crop waste (e.g., corn stalks, wheat chaff, and the like), sugar cane (e.g., bagasse), vegetable waste, fruit and vegetable waste (e.g., banana peels, orange peels, lemon peels, lime peels, potato peels, melon rinds, seeds, pits, and the like), as well as whole fruits whole vegetables, whole grains, whole grasses, and the like. Further examples include biomass raw materials that have been processed, including by compression, to form, for example, biobricks or other materials comprising biomass.

In further aspects disclosed herein, the carbonaceous material may include petroleum coke. Petroleum coke is solid carbonaceous material that may be derived, for example, from coal, coker unit operations, or cracker unit operations. Petroleum coke may include delayed coke, fluid coke, needle coke, lenticular coke, layer coke, aggregates, or mixtures thereof.

In further aspects disclosed herein, the carbonaceous material may comprise carbonaceous waste products. Carbonaceous waste products may include any carbon-containing material susceptible to upgrading and representing waste from industrial, natural, or municipal sources. For example, carbonaceous waste products may include sewage waste, refinery waste, agricultural waste, mixtures thereof, and the like.

During the heating with steam at superatmospheric pressure, the steam used for heating may be, for example, saturated steam or superheated steam. Saturated steam refers to steam in equilibrium with liquid water, which may be present during the heating of the carbonaceous material. Where the steam present is saturated steam, the temperature and pressure of the steam are related by a thermodynamic equilibrium commonly depicted by steam tables. When steam is heated beyond its equilibrium temperature at a given pressure, the steam may be referred to as superheated steam. Steam may be just slightly superheated, or may be significantly superheated, depending on the desired level of superheating.

The desired temperature to which the carbonaceous material is heated depends on several factors, including but not limited to, the carbonaceous material's initial properties, the desired final properties of the carbonaceous material, the nature of the carbonaceous material, as well as process conditions such as energy efficiency, materials limitations, and environmental conditions. In some cases, it may be desirable to heat the carbonaceous material to a temperature of at least about 250° F. Heating the carbonaceous material promotes desirable structural changes in the carbonaceous material, and drives moisture as well as other constituents from the interior of the coal to the surface of the coal. Thus, during the heating process, the carbonaceous material may become moist as liquid condensate forms on its surface and travels to its surface. The effects of heating are understood to occur along with the effects of pressurization, or independently, and changes in the carbonaceous material are not particularly ascribed to heating or pressurization in a manner that restricts the scope of the present invention.

In further aspects disclosed herein, heating the carbonaceous material may cause tars and other hydrocarbons in the carbonaceous material to become malleable. In still further aspects disclosed herein, carboxyl groups present on the surface of the carbonaceous material may degrade by decarboxylation. Decarboxylation may also increase the heat value of the carbonaceous materials, thus compounding the increase in heat value brought by decreasing the moisture level of the carbonaceous material.

In further aspects disclosed herein, the carbonaceous material may be heated to a temperature of at least about 400° F. For heating with saturated steam, for example, this temperature reflects a pressure of about 230 psig. At this temperature, certain of the effects of upgrading may be greater than at lower temperatures.

In some cases, it may be desirable to heat the carbonaceous material to a temperature not greater than about 1000° F. Pyrolysis is a process whereby organic material is decomposed at high temperatures. By avoiding excessive heating of the carbonaceous material, pyrolysis may be limited. Some degree of pyrolysis may be acceptable or desirable in certain of the methods disclosed herein.

In light of the aforementioned considerations, some aspects disclosed herein include heating the carbonaceous material to a temperature in the range from about 250° F. to about 1000° F. Further aspects disclosed herein include heating the carbonaceous material to a temperature in the range from about 400° F. to about 750° F. Still further aspects disclosed herein include heating the carbonaceous material to a temperature in the range from about 440° F. to about 550° F. The heating may be accomplished by steam. Where the steam is saturated steam, the pressures commensurate with the aforementioned temperatures may be calculated from a steam table.

Certain techniques for heating the carbonaceous material include heating the steam at superatmospheric pressure. The pressure of the steam may be dictated by the temperature of the steam, for example in the case of saturated steam, but the pressure might also be independently controllable during the heating process. This may be the case, for example, when heating with superheated steam, or when heating with another gaseous medium, irradiation, or other convective or conductive heating technique. When heating with steam, for example, the pressure of the steam may be held essentially unchanged during the heating. The pressure may also be increased, either gradually or rapidly, during the heating with steam. Further, the pressure may be controlled to include periods of stasis as well as periods of increase or decrease, in any combination as may be suitable.

In several aspects disclosed herein, steam at superatmospheric pressure is used to heat carbonaceous material. By exposing the carbonaceous material to pressurized steam, the carbonaceous material is both heated and pressurized. As process variables, temperature and pressure may to be independently controlled, although in certain situations, such as heating with saturated steam, the pressure and temperature variables are coupled. Thus, in certain aspects disclosed herein, it is understood that heating the carbonaceous material also means pressurizing the carbonaceous material.

The carbonaceous materials may be pressurized to varying degrees during the heating process. For example, in certain aspects disclosed herein, the carbonaceous material may be pressurized to at least about 15 psig. The pressurization may be caused by steam, or by any other fluid, including but not limited to liquids, gases, and supercritical fluids. Example gases include air, inert gases, nitrogen, oxygen, hydrogen, and mixtures thereof. Further examples of gases include steam mixed with any gas, such as air, insert gases, nitrogen, oxygen, and hydrogen. Example liquids include water, aqueous solutions, liquid hydrocarbons, ionic liquids, and mixtures thereof. Example supercritical fluids include supercritical carbon dioxide.

In further aspects disclosed herein, the carbonaceous material may be pressurized to at least about 250 psig. Certain pressures, in combination with certain temperatures, may yield desirable upgrading of the carbonaceous materials, and the particular temperatures and pressures chosen vary depending on the desired effect and the nature of the materials. In still further aspects disclosed herein, the carbonaceous material may be pressurized to no greater than about 1000 psig. Limiting the highest pressure of the process may present advantages such as reduced materials cost for the vessel used to contain the pressurized fluid.

In light of the aforementioned considerations, further aspects disclosed herein may pressurize the carbonaceous material from about 15 psig to about 1000 psig. Still further aspects disclosed herein may pressurize the carbonaceous material from about 400 psig to about 750 psig. Still further aspects disclosed herein may pressurize the carbonaceous material from about 500 psig to about 700 psig. An intermediate range may potentially present a balance between effecting desirable upgrading of the carbonaceous material and limiting materials and energy costs, as well as avoiding excessive pyrolysis of the carbonaceous material.

The duration of heating the carbonaceous material may vary depending on the other, related, process conditions such as temperature and pressure, and depending on the nature of the carbonaceous material, the desired upgrading, and various energy or economic limitations. For example, it may be desirable to operate certain methods disclosed herein so as to expedite the carbonaceous material through the process by minimizing the dwell time in the process equipment relied upon. In certain aspects disclosed herein the carbonaceous material is heated for a time in the range from about 10 minutes to about 60 minutes. In further aspects disclosed herein, the carbonaceous material is heated for a time in the range from about 15 minutes to about 25 minutes.

In some examples, at the conclusion of the heating step, the cooling of the carbonaceous material may begin. In some cases, it is undesirable to cool the carbonaceous material by releasing the pressure and exposing the carbonaceous material to the relatively cool atmosphere. Doing so may upset the equilibrium moisture level in the carbonaceous material, expanding the pores in the material as moisture rapidly exits the material. This process, sometimes called popcorning, may lead to dust formation, and commensurate problems with spontaneous combustion. Thus, cooling the carbonaceous material at superatmospheric pressure may be desirable for certain aspects disclosed herein.

In further aspects disclosed herein, cooling under pressure may cause the particle size of the carbonaceous material to shrink, without reducing the number of micropores on the surface of the particles. In further aspects disclosed herein, cooling under pressure leads to smaller, harder, more stable particles of carbonaceous material than cooling by decompressing. For example, when cooling by decompressing, the moisture level in the carbonaceous material may decrease, but the equilibrium moisture level in the carbonaceous material may not decrease as much, potentially contributing to spontaneous combustion or dust formation. Dust may also be reduced and controlled by keeping the surface of the carbonaceous material wet when possible. In further aspects disclosed herein, heating followed by cooling under pressure may decrease the Hardgrove index of the carbonaceous material, reflecting an increase in hardness. As a result of the increased hardness, the present invention may allow carbonaceous materials previous considered too soft for certain uses to be upgraded into harder forms, rendering them more suitable.

Some methods of cooling the carbonaceous material at superatmospheric pressure include adding a gas to control the pressure of the carbonaceous material during cooling. For example, where the cooling is effected by showering the carbonaceous material with liquid water, the gas may be added to control the pressure at superatmospheric levels. The gas may be added, for example, prior to the showering, during the showering, after the showering, or at any combination of those times. Where the heating was accomplished with steam, adding the gas allows the pressure to be controlled, altering the otherwise rapid fall in pressure that would accompany the condensing steam.

In one example, the following sequence of events may occur. First, the carbonaceous material is heated with steam in a vessel, and at the end of the heating, the atmosphere in the vessel is at a particular temperature and superatmospheric pressure. In this example, water is then introduced to cool the carbonaceous material, causing the steam to rapidly condense, and the pressure to rapidly fall. In this example, pressurized gas is introduced, taking the place of the steam and maintaining the pressure inside the vessel at a superatmospheric level while the carbonaceous material is cooled. This example procedure, among others, may reduce the popcorning effect by squeezing the carbonaceous material during cooling, and maintaining the equilibrium moisture level of the carbonaceous material at a desirable level, and maintaining the pore size of the carbonaceous material at a desirable level.

By introducing a new gas, other than steam, to control the pressure, the pressure may be programmed to follow a desired path. This path may include increases in pressure, decreases in pressure, and periods of relatively constant pressure. Eventually, the pressure may be decreased all the way to atmospheric pressure, so that the carbonaceous material may then be used for other purposes. For example, where the methods are conducted in a pressure vessel, when the cooling is complete, the pressurized gas may be vented and the vessel may be opened, thus allowing the removal of the carbonaceous material for further processing. In a further example, the pressure in the vessel may be reduce somewhat, for example to 50 psig, and remaining pressure in the vessel may be used, for example, to force liquids out of the vessel.

In certain aspects disclosed herein, the gas used to control the pressure of the carbonaceous material during cooling may be air. Air is readily available, and may present certain advantages related to its composition, including its significant proportion of oxygen, which may react desirably with the carbonaceous material in furtherance of the goals of the upgrading. In further aspects disclosed herein, the gas used to control the pressure of the carbonaceous material may include air, nitrogen, hydrogen, oxygen, and mixtures thereof. The constituents of the gas used to control the pressure of the carbonaceous material may contribute to the characteristics of the final product of the upgrading. In further aspects disclosed herein, the gas may comprise oxygen, for example oxygen in a range between 1 percent and 30 percent, for example in a range between 10 percent and 14 percent.

At the conclusion of the cooling step, it may be desirable to return the carbonaceous material to atmospheric pressure for further processing. The cooling step may be concluded when the carbonaceous material reaches a certain temperature. For example, the carbonaceous material may be below about 250° F. For example, the carbonaceous material may be below about 212° F. to avoid spontaneous combustion, or below 150° F. or 140° F. to enhance the safety of the process. The fluid medium used for the cooling step, having been warmed by contact with the carbonaceous material, may be recycled in an energy efficient manner.

All of the aforementioned aspects disclosed herein may be used in any combination. For example, in certain aspects disclosed herein, subbituminous coal may be first heated with steam at superatmospheric pressure, to reach a temperature of between 500° F. and 700° F., as well as a pressure in a range of 500 psig to 700 psig. In this example, the subbituminous coal may be heated for about 25 minutes. Following the heating, the subbituminous coal may then be cooled with a shower of water. As the water is introduced, pressurized air may likewise be introduced to control the pressure of the carbonaceous material. In this example, while the subbituminous coal is cooled, the pressure of the subbituminous coal is maintained essentially constant relative to the final pressure at which the subbituminous coal was heated. In this example, once the subbituminous coal reaches a desirable temperature, such as 140° F., the pressurized air is vented and the subbituminous coal is upgrading, having a lower moisture content, as well as lower contents of other undesirable constituents, such as sulfur, arsenic, sodium, chlorides, and mercury In certain aspects disclosed herein, the upgraded carbonaceous material that results from the methods disclosed herein may be combusted. Combustion of these upgraded materials will be more efficient than that of the respective unupgraded materials, because of the decreased moisture content. In further aspects disclosed herein, the upgraded carbonaceous materials may be combusted in a furnace implemented as part of a heat, steam, hot water, or power generation facility. For example, the upgraded carbonaceous materials may be combusted in a furnace designed to heat a boiler and generate steam. In further aspects disclosed herein, the steam may then be used to turn a turbine, and where the turbine is connected to a generator, the ultimate effect is to generate electricity. Thus, in certain aspects disclosed herein, the energy of the upgrading carbonaceous material is ultimately converted into electrical energy. By making use of the upgrading processes disclosed herein, the generation of electricity is ultimately done more efficiently and productively.

In further aspects disclosed herein, the carbonaceous material is contacted by several media. These media may include, for example, the ambient atmosphere, steam, pressurized steam, fluids including, for example, liquid water, and gases, for example air, including pressurized air. In several aspects disclosed herein, the carbonaceous material may contact these media in succession. For example, the carbonaceous material may first contact the ambient atmosphere. Then, in this example, the carbonaceous material may be contacted with steam at superatmospheric pressure. Then, in this example, the carbonaceous material may be contacted with liquid water. Then, in this example, the carbonaceous material may be contacted with a pressurized gas, other than steam. Finally, in this example, the carbonaceous material may again be contacted with the ambient atmosphere. In a different example, it may be desirable to overlap these steps so that at times, the carbonaceous material is in contact with several media at the same time. This may occur either transitionally, or intentionally to achieve a desired upgrading effect.

In further aspects disclosed herein, a carbonaceous material is provided, surrounded by an atmosphere at a first pressure. Then, the carbonaceous material is contacted with steam, wherein the steam has a first temperature and a second pressure greater than the first pressure, for a first time sufficient to reduce the weight percentage of a constituent of the carbonaceous material. Then, the carbonaceous material is contacted with liquid water for a second time sufficient to reduce the temperature of the atmosphere surrounding the carbonaceous material to a second temperature. Then, the carbonaceous material is contacted with a gas, other than steam, sufficient in quantity to maintain the pressure of the atmosphere surrounding the carbonaceous material at a third pressure, greater than the first pressure, until at least the end of the second time. Then, the pressure of the atmosphere surrounding the carbonaceous material is reduced to at most the first pressure.

The constituent of the carbonaceous material subject to reduction may, in some aspects disclosed herein, be water. In further aspects disclosed herein, the constituent may be sulfur, mercury, sodium, chlorides, or arsenic. In further aspects disclosed herein, several or all of these constituents may be subject to reduction, as well as further unenumerated constituents. Upgrading carbonaceous materials by removal of moisture is one aspect disclosed herein, but removal of other constituents may present a side-effect, an added benefit, or may be primary purpose of several of the methods disclosed herein. Certain constituents of carbonaceous material may cause the carbonaceous material to be unsuitable for use for combustion, or as a feedstock for other processes, such as chemicals and materials manufacturing processes.

By calling out three particular pressures, the aforementioned example does not limit the pressures to which the carbonaceous material may be exposed to merely three particular values. Indeed, pressures cannot be altered instantaneously, so even in examples where three particular pressures are desired, other pressures will arise in the transition periods. Furthermore, it may be desirable to pass through certain further pressures, or dwell at certain other further pressures, to effect the upgrading of the carbonaceous material.

In certain aspects disclosed herein, the third pressure is about equal to the second pressure. For example, it may be desirable to heat and cool the carbonaceous material at essentially the same pressure. In one example, the pressure of the carbonaceous material is increased during the heating step until a final heating pressure is reached, and then that heating pressure is substantially maintained for some period of the cooling. In another example, the pressure may fall somewhat during the cooling period. In a further example, the pressure may fall initially during the cooling period, but be restored to an elevated cooling pressure that is lower, the same, or higher than the final heating pressure. Thus, depending on the desired pressure as a function of time, the second pressure may be maintained essentially unchanged. Likewise, the third pressure may be maintained essentially unchanged. The second and third pressures may also be approximately the same, or different.

The first pressure reflects one pressure to which the carbonaceous material is exposed prior to heating. The carbonaceous material may be exposed to pressures other than the first pressure prior to heating. For example, the first pressure may be atmospheric pressure.

The second pressure reflects at least one pressure at which the carbonaceous material is pressurized during heating. The pressure may reach other levels in addition to the second pressure during heating. In further aspects disclosed herein, the second pressure may be at least about 15 psig. In still further aspects disclosed herein, the second pressure may be at least about 400 psig. In still further aspects disclosed herein, the second pressure may be at most about 1000 psig. In still further aspects disclosed herein, the second pressure may be in a range from about 15 psig to about 1000 psig. In still further aspects disclosed herein, the second pressure may be in a range from about 400 psig to about 750 psig. For example, the second pressure may be about 600 psig.

The first temperature reflects at least one temperature at which the carbonaceous material is heated. The temperature may reach other levels in addition to the first temperature during heating. In further aspects disclosed herein, the first temperature may be at least about 250° F. In still further aspects, the first temperature may be at least about 400° F. In still further aspects, the first temperature may be at most about 1000° F. In still further aspects, the first temperature may be in a range from about 250° F. to about 1000° F. In still further aspects, the first temperature may be in a range from about 400° F. to about 750° F. In still further aspects, the first temperature may be in a range from about 500° F. to about 700° F. For example, the first temperature may be about 600° F.

The first time reflects a process variable linked to the desired nature of the upgrading. The longer the carbonaceous material is heated, the more energy may be required. Further, the longer the carbonaceous material is heated, the greater the extent of the reduction of moisture or other constituents may be. Desired upgrading may often require a balance of constituent reduction as well as energy requirements, and therefore the time is an important process variable. The first time reflects at least one time during which the carbonaceous material is heated. The carbonaceous material may be heated during other times in addition to the first time. In certain aspects disclosed herein, the first time is in a range from about 10 minutes to about 60 minutes. In further aspects disclosed herein, the first time is in a range from about 15 minutes to about 25 minutes. For example, the first time may be about 20 minutes.

The second temperature reflects at least one temperature to which the carbonaceous material may be cooled. Cooling to other temperatures may also be desired. In certain aspects disclosed herein, the second temperature may be less than about 200° F. In further aspects disclosed herein, the second temperature may be less than about 150° F. In still further aspects disclosed herein, the second temperature may be about ambient temperature. It may in some cases be desirable to cool the carbonaceous material to a temperature below the boiling temperature of water so as to enhance safety and limit expansion of the pores of the carbonaceous material. It may in further cases be desirable to cool the carbonaceous material to temperatures lower than the boiling point of water to, for example, further enhance safety and reduce the chance of spontaneous combustion. Certain values of the second temperature may be mandated by industrial safety requirements.

The third pressure reflects at least one pressure at which the carbonaceous material may be cooled. Cooling at other pressures may also be desired. In certain aspects disclosed herein, the third pressure is greater than the second pressure. In further aspects disclosed herein, third pressure is less than the second. In still further aspects disclosed herein, the third pressure is varied during the second time. For example, the third pressure may be at least about 15 psig. For example, the third pressure may be at least about 400 psig. For example, the third pressure may be at most about 1000 psig. For example, the third pressure may be in a range from about 15 psig to about 1000 psig. For example, the third pressure may be in a range from about 400 psig to about 750 psig. For example, the third pressure may be about 600 psig.

The third pressure may be established by a gas. Suitable gases may include, for example, air, nitrogen, hydrogen, oxygen, inert gases, or any mixture thereof. Any gas capable of pressurization necessary to effect the desired upgrading may be suitable. Certain gases may, in addition to providing a pressurized medium, additionally provide certain reactivity or lack of reactivity desirable in upgrading. Example of potentially reactive gases include oxygen and hydrogen, and mixtures of gases including oxygen and hydrogen.

The second time reflects at least one time during which the carbonaceous material may be cooled. This time may, for example, reflect the time during which the carbonaceous material is showered with water. It may also, for example, reflect the time during which the carbonaceous material is cooling while exposed to superatmospheric pressure. Cooling during other times may also be desired. For example, if, at the conclusion of the second time, the carbonaceous material has a temperature greater than ambient temperature, then the carbonaceous material may continue to cool after the conclusion of the second time. This later cooling may not, for example, occur while the carbonaceous material is exposed to superatmospheric pressure. For example, where the carbonaceous material was exposed to superatmospheric pressure instead a vessel, the cooling during the second time may occur inside the vessel, and later cooling may occur outside the vessel, or inside the vessel but after the interior of the vessel is exposed to atmospheric conditions. The second time may be, for example, sufficient time to cool the carbonaceous material to a temperature that allows maintenance of the structural integrity of the carbonaceous material. In a further example, the second time may be sufficient to cool the carbonaceous material to a temperature specified by safety requirements effecting a reduction in the likelihood of spontaneous combustion of the carbonaceous material.

In certain aspects disclosed herein, carbonaceous material may be provided and surrounded by an atmosphere at a first pressure. Then, the carbonaceous material may be contacted with a gas sufficient in quantity to maintain the pressure of the atmosphere surrounding the carbonaceous material at a second pressure greater than the first pressure. Then, the carbonaceous material may be irradiated with microwave radiation for a first time sufficient to reduce the weight percentage of water in the carbonaceous material, thereby heating the atmosphere surrounding the carbonaceous material to a first temperature. Then, the carbonaceous material may be cooled for a second time sufficient to reduce the temperature of the atmosphere surrounding the carbonaceous material to a second temperature less than about 200° F. Then, the pressure of the atmosphere surrounding the carbonaceous material may be reduced to at most the first pressure.

In further aspects disclosed herein, the cooling of the carbonaceous material during the second time may be accomplished by contacting the carbonaceous material with liquid water. In still further aspects disclosed herein comprising heating with microwave radiation, heating may be additionally accomplished by heating with a convective medium such as steam, or other gases such as air, nitrogen, oxygen, hydrogen, or mixtures thereof. Heating may also be additionally accomplished by exposing the carbonaceous material to a liquid, such as water or liquid hydrocarbons, or supercritical fluid medium, such as carbon dioxide. Where heating is accomplished, at least in part, by microwave radiation, any form of microwave radiation capable of heating carbonaceous material, or a medium in contact with carbonaceous material, may be used.

In certain aspects disclosed herein, the first temperature reflects just one temperature to which the carbonaceous material may be heated with, at least in part, microwave radiation. In still further aspects disclosed herein, the first temperature may be at least about 250° F. In still further aspects disclosed herein, the first temperature may be at least about 400° F. In still further aspects disclosed herein, the first temperature may be at most about 1000° F. In still further aspects disclosed herein, the first temperature may be in the range of about 250° F. to about 1000° F. In still further aspects disclosed herein, the first temperature may be in the range of about 400° F. to about 750° F. In still further aspects disclosed herein, the first temperature may be in the range of about 500° F. to about 700° F. For example, the first temperature may be 600° F.

The medium in which the carbonaceous material is held during heating and cooling may be a fluid medium, such as a medium of gas, liquid, or supercritical fluid. In certain aspects disclosed herein, the medium is pressurized. The second pressure represents at least one pressure at which the carbonaceous material is held during heating. In certain aspects disclosed herein, the second pressure is at least about 15 psig. In further aspects disclosed herein, the second pressure is at least about 400 psig. In still further aspects disclosed herein, the second pressure is at most about 1000 psig. In still further aspects disclosed herein, the second pressure is in the range of about 15 psig to about 1000 psig. In yet another aspect disclosed herein, the second pressure is in the range of about 400 psig to about 750 psig. For example, the second pressure may be 600 psig.

In certain aspects disclosed herein, the first pressure may represent at least one pressure to which the carbonaceous material is exposed prior to heating with, at least in part, microwave radiation. In further aspects disclosed herein, the third pressure may represent at least one pressure to which the carbonaceous material is exposed after cooling. For example, the first pressure may be about atmospheric pressure. For example, the second pressure may be greater than the first pressure. For example, the third pressure may be about atmospheric pressure. For example, the third pressure may be greater than the second pressure. In still further aspects disclosed herein, the first, second, or third pressures may be varied during the course of the upgrading. For example, the third pressure may be varied during the second time.

In certain aspects disclosed herein, the first time reflects at least one time during which the carbonaceous material is heated with, at least in part, microwave radiation. The carbonaceous material may be heated during other times in addition to the first time. In certain aspects disclosed herein, the first time is in a range from about 10 minutes to about 60 minutes. In further aspects disclosed herein, the first time is in a range from about 15 minutes to about 25 minutes. For example, the first time may be about 20 minutes.

In further aspects disclosed herein, the second time reflects at least one time during which the carbonaceous material is cooled. Following heating by, at least in part, microwave radiation, the carbonaceous material may be cooled by, for example, showering with liquid water. The carbonaceous material may also be cooled by exposure to any cool convective medium, such as a gas, liquid, or supercritical fluid. For example the carbonaceous material may be held in a pressurized gas during cooling, and at least in part cooled by the pressurized gas. For example, the gas may be air, nitrogen, hydrogen, oxygen, inert gases, or mixtures thereof. The second time may be, for example, sufficient time to cool the carbonaceous material to a temperature that allows maintenance of the structural integrity of the carbonaceous material. In a further example, the second time may be sufficient to cool the carbonaceous material to a temperature specified by safety requirements effecting a reduction in the likelihood of spontaneous combustion of the carbonaceous material.

Carbonaceous materials may be upgraded by the methods disclosed herein. Carbonaceous materials treated by the methods disclosed herein may have desirable properties, such as lower contents of water, sulfur, arsenic, sodium, chlorides, mercury, or other constituents, including but not limited to undesirable constituents. As a result, carbonaceous materials upgraded by methods disclosed herein may have higher heating values, energy densities, and may reduce the effects of pollution caused by combusting or otherwise further processing carbonaceous materials. Compositions comprising carbonaceous materials upgraded by the methods disclosed herein may include, for example, subbituminous coal, or any other carbonaceous material disclosed herein.

Systems

The methods disclosed herein may optionally be implemented using the systems disclosed herein. Likewise, the systems disclosed herein may be capable of implementing the methods disclosed herein, in addition to other methods, within the bounds of the systems disclosed herein. The systems disclosed herein may be best understood with reference to certain, merely exemplary, figures.

FIG. 1 is a block diagram of an exemplary system 100 capable of upgrading carbonaceous materials. The system 100 may include a processor 102 for reducing the water content in the carbonaceous material. The processor 102 may be capable of accepting as an input carbonaceous material, and providing as an output carbonaceous material having been upgraded by the processor. The processor 102 may also be suitable for reducing further constituents in the carbonaceous material, including but not limited to sulfur, arsenic, sodium, chlorides, and mercury, as well as combinations thereof.

The processor 102 may, for example, comprise a vessel. The processor 102 may, for example, comprise a vessel capable of withstanding superatmospheric pressure. The processor 102 may, for example, comprise an autoclave. The processor 102 may be of any size necessary to process a desired amount of carbonaceous material. For example, the processor 102 may be a laboratory or bench-scale processor, capable, for example, of processing several ounces or several pounds of carbonaceous material at one time. In a further example, the processor 102 may be a pilot-scale processor, capable, for example, of processing several pounds or several tons of carbonaceous material, for example one ton of coal, at one time. In a still further example, the processor 102 may be an industrial-scale processor, capable, for example, of processing several tons of carbonaceous material, for example about 60 tons of coal per hour. For example, the processor 102 may be capable of processing at least about 20 tons of coal at one time. For example, the processor 102 may be capable of processing a several batches of coal, such as three batches of coal, totaling t least about 60 tons of coal per hour.

The processor may be designed to upgrade carbonaceous material while expending energy efficiently. For example, the processor may be capable of upgrading each pound of carbonaceous material, where the carbonaceous material is coal, for less than about 500 BTU.

The processor 102 may be constructed of any material suitable for processing carbonaceous materials. For example, where the processor 102 is a pressure vessel, the processor may be constructed of a material suitable for withstanding superatmospheric pressures. In a further example, the processor 102 may be constructed of steel or carbon steel. In a still further example, the processor 102 may be constructed of stainless steel. Certain materials may be more desirable than others, in order to provide corrosion resistance, resistance to physical pressure, and resistance to thermal and chemical assault.

The processor 102 may include an input/output mechanism 104 for causing the carbonaceous material to enter and exit the processor 102. In some aspects disclosed herein, the input/output mechanism 104 may reflect loading the processor 102 with carbonaceous material, and unloading it. The loading and unloading of the processor 102 may be accomplished by manual techniques or mechanized techniques. Manual techniques may include, for example, shoveling, carrying, delivering, and the like. For example, in a bench-scale processor 102, the input/output mechanism 104 may represent a basket that may be placed in the processor 102 and later removed from the processor 102. Where the processor 102 is a vessel, the input/output mechanism may operate through one or more doors, hatches, or airlocks in the vessel.

In an industrial-scale processor 102, the input/output mechanism 104 may represent a mechanized technique for loading and unloading. For example, the input/output mechanism 104 may represent a mechanized conveyance for moving carbonaceous material into and out of the vessel. For example, the input/output mechanism 104 may represent a railed conveyance, or a movable cart, or a conveyer belt, for moving carbonaceous material into and out of the vessel.

The railed conveyance, reflected by the input/output mechanism 104, may be, for example, an overhead railed conveyance, or it may be a ground-disposed railed conveyance. The railed conveyance may include, for example, one, two or more rails. The railed conveyance may include a mechanism for propulsion. The propulsion mechanism may be external to the conveyance, such as manual propulsion, animal propulsion, for example draught horses, oxen, camels, elephants, or mules, or engine-driven propulsion in the form of, for example, a locomotive, skid loader, or tractor. The railed conveyance may, for example, be a monorail disposed either on the ground or dispose in the air. The conveyance may comprise carts, baskets, trolleys, or gondolas capable of carrying the carbonaceous material, and running along a rail or rails.

The processor 102 may be capable of accepting inputs and providing outputs through process streams generally. In some aspects disclosed herein, an input 106 may be provided to the processor 102. The input 106 may deliver, for example, heating media such as steam. The input 106 may represent a process stream, pipe, or line, connected to the processor 102. The input 106 may be adapted to handle steam, including high temperature and high pressure steam. For example, the input 106 may be capable of delivering steam at pressures up to about 1000 psig and at temperatures up to about 1000° F. Where the processor 102 comprises a vessel, the input 106 may, for example, comprise a pipe connected to the vessel through a port admitting steam to the interior of the vessel. The steam may be delivered to the processor 102 by the input 106 in order to provide a heating medium as well as a pressurized atmosphere within which the carbonaceous material may be upgraded. The steam may be delivered through a port adapted to, for example, a manifold adapted to distribute or sparge steam throughout the interior of the vessel.

In further aspects disclosed herein, an input 108 may be provided to the processor 102. The input 108 may deliver, for example, cooling media such as liquid water. The input 108 may represent a process stream, pipe, or line, connected to the processor 102. Where the processor 102 comprises a vessel, the input 108 may, for example, comprise a pipe connected to the vessel through a port admitting water, or solutions comprising water, to the interior of the vessel. The input 108 may be adapted to handle water of various temperatures and pressures, and may be constructed of materials suitable for resistance to physical and chemical pressures applied by the water or other constituents carried in the water. The water may be delivered to the processor 102 by the input 108 in order to provide a cooling medium, as well as a means for washing or rinsing the contents of the processor 102, including but not limited to carbonaceous materials. The water may be delivered through a port adapted to, for example, a manifold adapted to distribute, shower, or sprinkle water throughout the interior of the vessel.

In still further aspects disclosed herein, an input 110 may be provided to the processor 102. The input 110 may deliver, for example, pressurizing media such as gas. The input 110 may represent a process stream, pipe, or line, connected to the processor 102. Where the processor 102 comprises a vessel, the input 108 may, for example, comprise a pipe connected to the vessel through a port admitting gas to the interior vessel. The input 110 may be adapted to handle compressed gas, including pressurized gas at superatmospheric pressures. For example, the input 110 may be capable of delivering gases at pressures up to about 1000 psig. The gases may be delivered to the processor 102 by the input 110 in order to provide a pressurized medium, as well as a medium for heating or cooling, for carbonaceous materials. The gas may be delivered to a port adapted to, for example, a manifold adapted to distribute gas through the interior of the vessel, including, for example, delivery through one or more expansion valves.

In still further aspects disclosed herein, the processor 102 may disgorge its contents through any suitable means. For example, gases may be released through vents, valves or ports, either into pipes, lines, streams, or ducts, or into atmosphere. Gases may also be released through one or more doors or hatches in the processor 102. Further, liquids and other fluids may be released through drains, ports or valves disposed in any location in the processor 102, including the top, sides, or bottom. For example, liquids may be released through one or more ports in the bottom of the processor 102, and the processor 102 may be designed to cause liquids to flow to one or more ports in the bottom of the processor 102.

Figure 2:
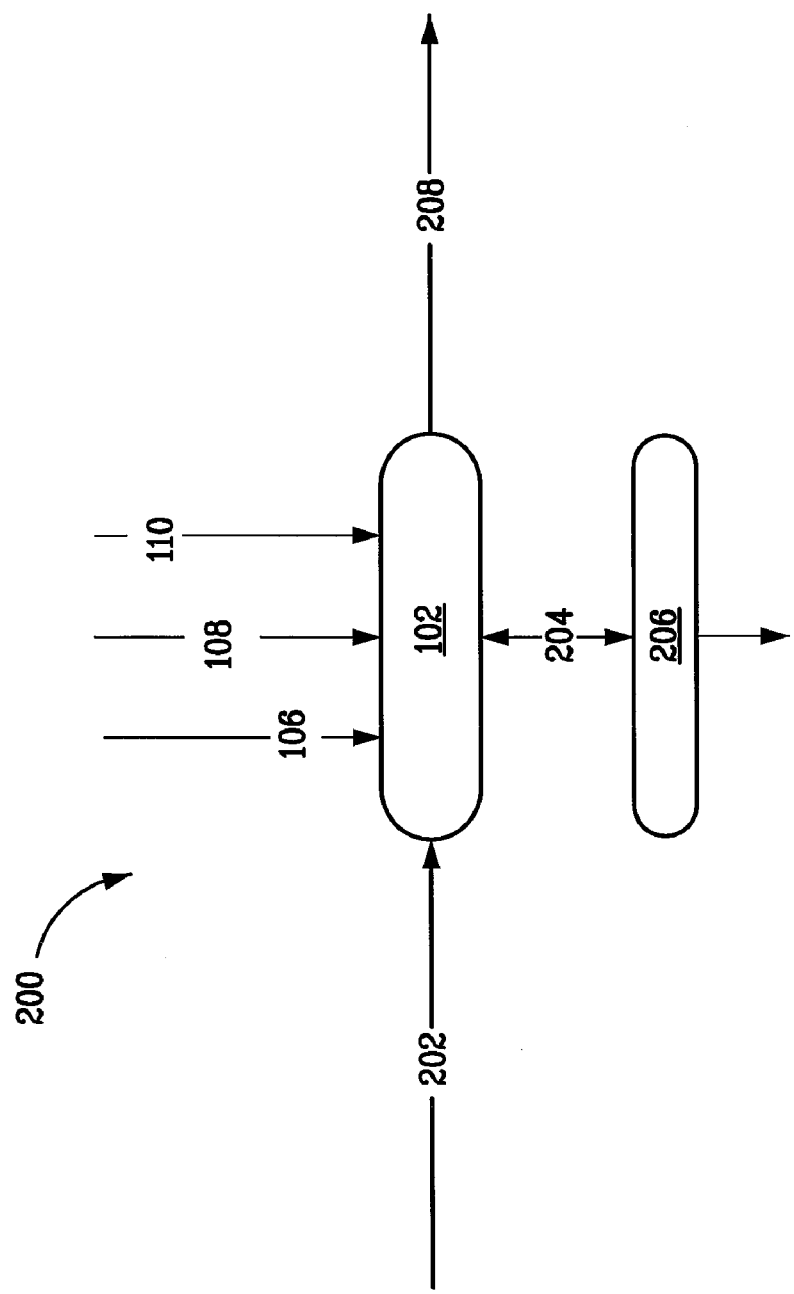
FIG. 2 depicts a further embodiment of a system for upgrading carbonaceous material including but not limited to a processor and an energy recovery tank.

FIG. 2 is a block diagram of an exemplary system 200 capable of upgrading carbonaceous materials. The system 200 may include a processor 102 for reducing the water content in the carbonaceous material. Any or all of the features of the exemplary system 100 may be incorporated in the exemplary system 200. The processor 102 may accept an input of carbonaceous material through some input mechanism 202. Any of the aforementioned mechanisms for moving carbonaceous material, including the input/output mechanisms 104, may be implemented in the input mechanism 202. For example, carbonaceous material may be introduced to the processor 102 by means of a railed conveyance, such as an overhead railed conveyance, such as a basket, trolley, or gondola hanging from an overhead rail. In a further example, the railed conveyance comprises a rail and a cart movable along the rail. In a still further example, the railed conveyance comprises a rail, a head movable along the rail, and a cart, hanging from the head, for carrying the carbonaceous material.

A processor 102 may be configured with one or more ports for moving fluids into and out of the processor 102, wherein these ports may, for example, be connected to other units via streams, pipes, lines, ducts, tubes, and the like. For example, a stream 204 may be provided to carry fluids into and out of the processor 102. The stream 204 may represent pipes, lines, ducts, tubes, or other means for transporting fluids. The stream 204 may be designed, by means of valves such as check valves, or other techniques, to allow for inputs to the processor 102. The stream 204 may also be designed by similar means to allow for outputs from the processor. The stream 204 may also be designed for two-way movement. For example, the stream 204 may be represent a stream carrying steam, water, gases, other liquids, or other fluids such as supercritical carbon dioxide. For example, the stream 204 may comprise a pipe capable of withstanding superatmospheric pressure. For example, the stream 204 may be constructed of steel or stainless steel and may be capable of withstanding about 1000 psig.

The stream 204 may in some cases be connected to an energy recovery tank 206. The energy recovery tank may accept inputs from the stream 204, may provide outputs to the stream 204, and may, for example, accept inputs from one or more further streams, or provide outputs to one or more further streams. The energy recovery tank 206 may be a vessel capable of holding fluids, including gases, liquids, and supercritical fluids. The fluids may also have solids entrained within them. In some aspects disclosed herein, the fluids held by the energy recovery tank 206 may be pressurized. For example, the energy recovery tank 206 may hold steam at superatmospheric pressure. For example, the energy recovery tank 206 may hold steam at a pressure of up to about 1000 psig.

The energy recovery tank 206 may, for example, have further ports disposed along the bottom or sides of the energy recovery tank 206 to allow for removal of liquids, including solids entrained within the liquids. The energy recovery tank 206 may, for example, have further ports disposed along the walls of the energy recovery tank 206 to allow for removal or addition of gases. The energy recovery tank 206 may be constructed of materials suitable for holding fluids, including corrosive fluids, at elevated pressures or temperatures, including pressures up to about 1000 psig or temperatures up to about 1000° F. For example, the energy recovery tank 206 may be constructed of steel or stainless steel.

The processor 102, stream 204, and energy recovery tank 206 may be operated in concert such that the stream 204 provides a mechanism for communicating fluids and energy between the processor 102 and energy recovery tank 206. For example, if the processor 102 contains a pressurized gas, and the gas is allowed to pass through the stream 204, the gas may then fill the energy recovery tank 206. For example, if the processor 102 contains liquids, the liquids may drain or be forced by pressure out of the processor 102, pass through the stream 204, and enter the energy recovery tank 206. For example, if the processor 102 contains a warm fluid, that fluid may be allowed to pass through the stream 204 and enter the energy recovery tank 206, thus transferring the energy of the warm fluid from the processor 102 to the energy recovery tank 206. In a further example, the fluid passing from the processor 102 to the energy recovery tank 206 may include a mixture of any of liquids, gases, and solid entrained within the liquids or gases, or supercritical fluids such as supercritical carbon dioxide.

Likewise, similar communication between the processor 102 and the energy recovery tank 206 through the stream 204 may be effected in the opposite direction, by allowing gases, liquids, or other fluids to pass from the energy recovery tank 106 to the processor 102. Such communication may happen in sequence. For example, a pressurized fluid may be stored in the processor 102. Then, the pressurized fluid may be allowed to pass through the stream 204, for example by opening a valve. Then the pressurized fluid may enter the energy recovery tank 206, and the energy recovery tank may be subsequently sealed from the stream 204, for example by closing a valve. In a further example, this process may be reversed, by then opening a valve to allow the pressurized fluid to exit the energy recovery tank 206, pass through the stream 204, and re-enter the processor 102.

Similarly to input 202, with regard to output 208, any of the aforementioned mechanisms for moving carbonaceous material, including the input/output mechanisms 104, may be implemented in the output 208. For example, carbonaceous material may be provided from the processor 102 by means of a railed conveyance, such as an overhead railed conveyance, such as a basket, trolley, or gondola hanging from an overhead rail. As with the input/output mechanisms 104, it is not necessary that the carbonaceous material enter and exit the processor 102 by different means or the same means. For example, the processor 102 may comprise one hatch, two hatches, or more hatches, and the input/output mechanism(s) may operate through one or more of these hatches.

Figure 3:
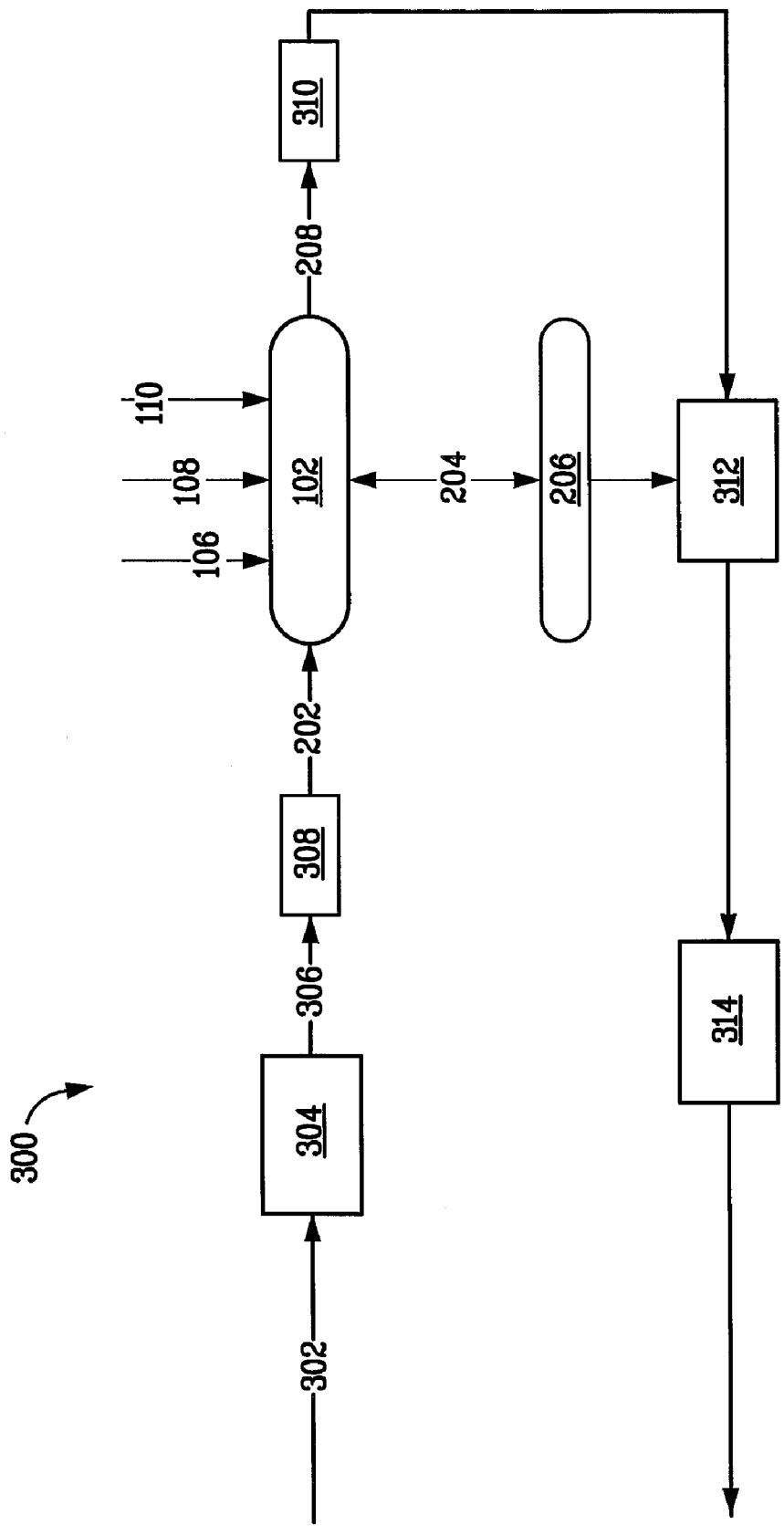
FIG. 3 depicts a further embodiment of a system for upgrading carbonaceous material including but not limited to a processor, an energy recovery tank, a pre-processor, and a centrifuge.

FIG. 3 is a block diagram of an exemplary system 300 capable of upgrading carbonaceous materials. The system 300 may include a processor 102 for reducing the water content in the carbonaceous material. Any or all of the features of the exemplary system 100 or the exemplary system 200 may be incorporated in the exemplary system 300. For example, the streams 106, 108, 110, and 204 may incorporate any or all of the aforementioned features and examples ascribed those or similar components. Likewise, the energy recovery tank 206 may, in the context of exemplary system 300, incorporate any or all of the aforementioned features.

Exemplary system 300 may incorporate further streams for moving solids, liquids, gases, and mixtures of these materials representing multiphase flows, through the system. For example, stream 302 may provide carbonaceous material to the system 300. The carbonaceous material may be provided in batches or continuously. For example, the carbonaceous material may be provided in batches delivered by truck, cart, trolley, wagon, gondola, railcar, basket, sack, or any other appropriate method for delivering batches of solid or semi-solid material. For example, the carbonaceous material may be provided continuously, for example delivered by conveyor belt, fluidized solid transport, screw feed, or other means of continuously transporting solids or semi-solids. The stream 302 may represent any of the aforementioned methods of providing carbonaceous material.

Stream 302 may provide carbonaceous material to a pre-processor 304. The pre-processor 304 may be implemented to process, treat, or upgrade the carbonaceous material prior to entering the processor 102. For example, the pre-processor 304 may: sort particles of carbonaceous material; size particles of carbonaceous material; crush particles of carbonaceous material; wet particles of carbonaceous material; dry particles of carbonaceous material; sieve particles of carbonaceous material; irradiate particles of carbonaceous material; comminute particles of carbonaceous material; dewater particles of carbonaceous material; expose particles of carbonaceous material to gases, liquids, or supercritical fluids; heat particles of carbonaceous material; cool particles of carbonaceous material; and the like. In further examples, the carbonaceous material may be present in forms other than particles. For example, the carbonaceous materials may be provided in a slurry, in a powder, or in a large mass. Any of the aforementioned treatments, as well as combinations thereof, may be applied to carbonaceous materials in other forms by the pre-processor 304.

In further aspects disclosed herein, the pre-processor 304 is a crusher. A crusher may be used to processor solid material, comminuting the material and thereby reducing the size of the material particles. For example, where the carbonaceous material is coal of a certain size, for example 2 inch particles, the crusher may reduce the size of the coal particles to a smaller size, for example a size in the range of fine dust to about 12 inches, for example, 1 inch particles, ¾ inch particles, ½ inch particles, ¼ inch particles, or ⅛ inch particles. Crushers may be operated to produce solid particles of essentially any size desired. Crushers may operate through a variety of means, including rollers, grinders, mills, and the like. Crushing may, for example, be desirable to expose more surfaces of the carbonaceous material to exposure to the working fluids of the further aspects of the systems and methods described herein. For example, crushing carbonaceous material may facilitate washing sulfur from the exposed surfaces of the carbonaceous material.

In further aspects disclosed herein, the pre-processor 304 may be a screen or an air jig. Screens and jigs generally are process equipment designed to separate or sort solid particles. Screens and jigs may rely on, for example, gravity, agitation, a working fluid, or combination thereof. An air jig may comprise a jig wherein a working fluid comprising air is used to facilitate the operation of the jig. For example, an air jig may comprise a one or more surfaces, for example a conveyor belt or series of plates, comprising pores of various sizes. The surfaces may be moved, agitated, or exposed to moving air in order to facilitate the movement of carbonaceous material across and through the surfaces.

For example, where the carbonaceous material represents a certain size distribution of particles, the size distribution of pores in the surfaces may be selected to separate fine particles from coarse particles. In this manner, for example, coal fines may be separates from larger coal particles. Such a separation of particle sizes may be accomplished by a screen or an air jig. In some cases, it may desirable to pass coal fines to the processor 102, but in other cases it may not, depending on the desired upgrading and the specific design of the coal transportation equipment and the processor 102. The working fluid in the air jig may also be used to warm, cool, dry, or brush the surfaces of the carbonaceous material.

For example, an air jig may comprise a bed that is on an incline, wherein the bed may vibrate to cause the carbonaceous material to move down the incline. Further to this example, air may pass up through the material, and the material may then sort by density as lighter material flies higher than heavier material. The air jig may, for example, be desirable to separate pyrites from the carbonaceous material.

In further aspects disclosed herein, the pre-processor 304 may be a wet jig. A wet jig may comprise a jig wherein a working fluid comprising water, or a solution of water and various components is used to facilitate the operation of the jig. For example, the working fluid may comprise water and hydrogen peroxide. For example, the working fluid may comprise water entraining solid particles. A wet jig may comprise a one or more surfaces, for example a conveyor belt or series of plates, comprising pores of various sizes. The surfaces may be moved, agitated, or exposed to moving fluids including liquids, such as water, and gases in order to facilitate the movement of carbonaceous material across and through the surfaces. For example, where the carbonaceous material represents a certain size distribution of particles, the size distribution of pores in the surfaces may be selected to separate fine particles from coarse particles. In this manner, for example, coal fines may be separates from larger coal particles.

Further aspects of a wet jig include wetting, washing, showering, or rinsing the carbonaceous material. Components of the carbonaceous material may in this manner be removed and carried away by the working fluid. For example, where the carbonaceous material is coal, and the working fluid is water, the wet jig may effect a cleaning of the surface of the coal, carrying away, for example, sulfur and ash. Further aspects of a wet jig include warming or cooling the carbonaceous material with the working fluid. For example, the wet jig may not only sort the carbonaceous material, it may also wash the carbonaceous material, and it may also pre-heat the carbonaceous material. For example, the water used in the wet jig may be of a temperature in the range between about 100° F. and about 200° F.

In further aspects disclosed herein, the pre-processor 304 may be a centrifuge. The carbonaceous material may be, in some aspects disclosed herein, wet. The carbonaceous material may be inherently wet, as in the case of, for example, peat. The carbonaceous material may have been wetted by other pre-processing steps, for example a washing or wet pre-heating step. The carbonaceous material may have also become wet due to exposure to wet ambient conditions, for example rainfall.

Yet, wet carbonaceous material may not be desired for use in the other upgrading units, including the processor 102. For example, where the processor 102 heats the carbonaceous material, heating of excess water on the surface of the carbonaceous material may be wasteful of thermal energy. Thus, the pre-processor 304 may including drying the carbonaceous material. Reduction of the surface moisture of the carbonaceous material may, among other effects, limit the quantity of carbonaceous material to be heated in the processor 102, therefore reducing the energy expended. During the drying process, and depending on the nature of the process, the coal may also cool.

For example, the pre-processor 304 may be a centrifuge. A centrifuge may be designed as a batch or continuous process, in vertical or horizontal configuration, and may be operated at various speeds to extract different quantities of water depending on the upgrading desired. It may, for example, be a vibrating centrifuge.

In still further aspects disclosed herein, the pre-processor 304 is a combination of unit operations, including, for example, a wet jig and a centrifuge. A further example of a pre-processor 304 is a combination of an air jig, a wet jig, and a centrifuge. A further example of a pre-processor 304 is a combination of a crusher, an air jig, a wet jig, and a centrifuge. The pre-processor 304 may provide desirable effects by removing certain constituents of the carbonaceous material before exposure to the processor 102. For example, by removing ash and pyrites, energy need not be expending in the processor 102 heating these constituents.

The pre-processor 304 may provide carbonaceous material, as well as other outputs, for further use in the system 300. Likewise, the pre-processor 304 may require certain inputs. For example, where the pre-processor 304 is a wet jig, the pre-processor 304 may require an input of working fluid, for example water, and may produce an output of water. Among the contemplated outputs of the pre-processor 304 is, for example, the stream 306, providing carbonaceous material having been processed by the pre-processor 304. As with the stream 302, the stream 306 may represent a variety of mechanisms for transporting carbonaceous material, including continuous means.

Stream 306 may provide carbonaceous material to loader 308. The loader 308 may convert the transportation means represented by stream 306 into the transportation means represented by input 202. For example, where carbonaceous material is moved through stream 306 by means of a conveyer belt, and where carbonaceous material is moved by input 202 by means of a railed conveyance, the load 308 may accept the carbonaceous material from the conveyor belt and load it into the railed conveyance. For example, the railed conveyance may comprise carts capable of holding carbonaceous material. The loader, for example, may comprise people with shovels moving the carbonaceous material from the output of a conveyor belt into the carts. In a further example, the conveyor belt may deposit the carbonaceous material into one or more hoppers capable of guiding the carbonaceous material into the carts. In a further example, a machine such as a backhoe or loader pail may be used to place the carbonaceous material into the carts.

The streams 302 and 306 and the input 202 may operate in concert with the pre-processor 304, loader 308, and processor 102. For example, the stream 302 may provide carbonaceous material, for example coal, to the pre-processor 304. The pre-processor 304 may treat, process, or upgrade the carbonaceous material in any of the aforementioned manners. The stream 306 may then provide carbonaceous material to the loader 308. The loader 308 may then load the carbonaceous material into the input mechanism 202, for example a railed conveyance comprising a cart. The input mechanism 202 may then provide the carbonaceous material to the processor, where it may be processed, for example, in accordance with the description of system 200.

All of the features and aspects of the system 200, processor 102, and energy recovery tank 206 may be incorporated into the system 300. In the context of the system 300, for example, the processor 102 may operate differently because of the incorporation of the pre-processor 304. For example, where the pre-processor 304 accomplished pre-heating the carbonaceous material, the processor 102 may provide less heat than would otherwise be required for suitable upgrading.

The processor 102 may provide carbonaceous material to the output 208, wherein the output 208 may have, for example, any or all of the features described herein. The output 208 may provide carbonaceous material to an unload 310. The unloader 310 may, in a similar but reverse manner to the loader 308, provide a transition between the output mechanism 208, and further means for transporting the carbonaceous materials to other aspects of the system 300. For example, the unloader 310 may receive carts of carbonaceous material, for example coal, moved by a railed conveyance. The unloader 310 may, for example, unload the railed conveyance by means of manual shoveling, mechanical shoveling or scooping, dumping, or disgorgement through one or more openings in, for example, carts of the railed conveyance. The unloader 310 may provide the carbonaceous material to a continuous means for transporting carbonaceous material, such as a conveyor belt or screw mechanism. The unloader 310 may provide the carbonaceous material to further means for transporting carbonaceous material, such as trucks, railcars, and the like.

Having been provided by the unloader 310, the carbonaceous material may be further processed, upgraded or treated by, for example, any or all of the system components discussed herein. For example, the unloader 310 may provide carbonaceous material, directly or indirectly, to a centrifuge 312. The carbonaceous material may be, in some aspects disclosed herein, wet. Following residence in the processor 102, the carbonaceous material may yet still be wet. For example, the processor 102 may expose the carbonaceous material to a liquid medium, for example a shower of water. For example, the processor 102 may heat the carbonaceous material, or heat the carbonaceous material under pressure, and thereby force moisture from the interior of the carbonaceous material to the exterior of the carbonaceous material.

Further, the carbonaceous material may be inherently wet, as in the case of for example, peat. The carbonaceous material may have been wetted by other pre-processing steps, for example a washing or wet pre-heating step. The carbonaceous material may have also become wet due to exposure to wet ambient conditions, for example rainfall. Yet, wet carbonaceous material may not be desired for use in the other upgrading units, or for use in commercial sale, transportation, combustion, or chemical processing. For example, where the carbonaceous material is a fuel, and the carbonaceous material must be transported, any excess surface moisture may increase the cost of transportation. Thus, the centrifuge 312 may be provided to remove water from the carbonaceous material. A centrifuge may be designed as a batch or continuous process, in vertical or horizontal configuration, and may be operated at various speeds to extract different quantities of water depending on the upgrading desired.

The carbonaceous material may be provided by the centrifuge 312 to a post-processor 314. The carbonaceous material may be transferred between the centrifuge 312 and the post-processor 314 by any of the aforementioned streams, inputs, outputs, and transportation mechanisms. The post-processor 314 may include, for example, an air dryer or a coater. An air dryer may provide warm or dry air which may pass over the carbonaceous material and further dry its exterior. A coater may provide to the carbonaceous material a chemical, solution, or material for coating the carbonaceous material. The coating may be applying by spraying, submerging, showering, and the like. The coating may, for example, comprise a treatment for reducing the likelihood of spontaneous combustion. In further examples, the coating may suppress fires, or the coating may reduce the formation of dust. The coating may, for example, comprise a gel, liquid or foam. The coating, for example, may comprise wax, an organic polymer, or mixture thereof.

Figure 4:
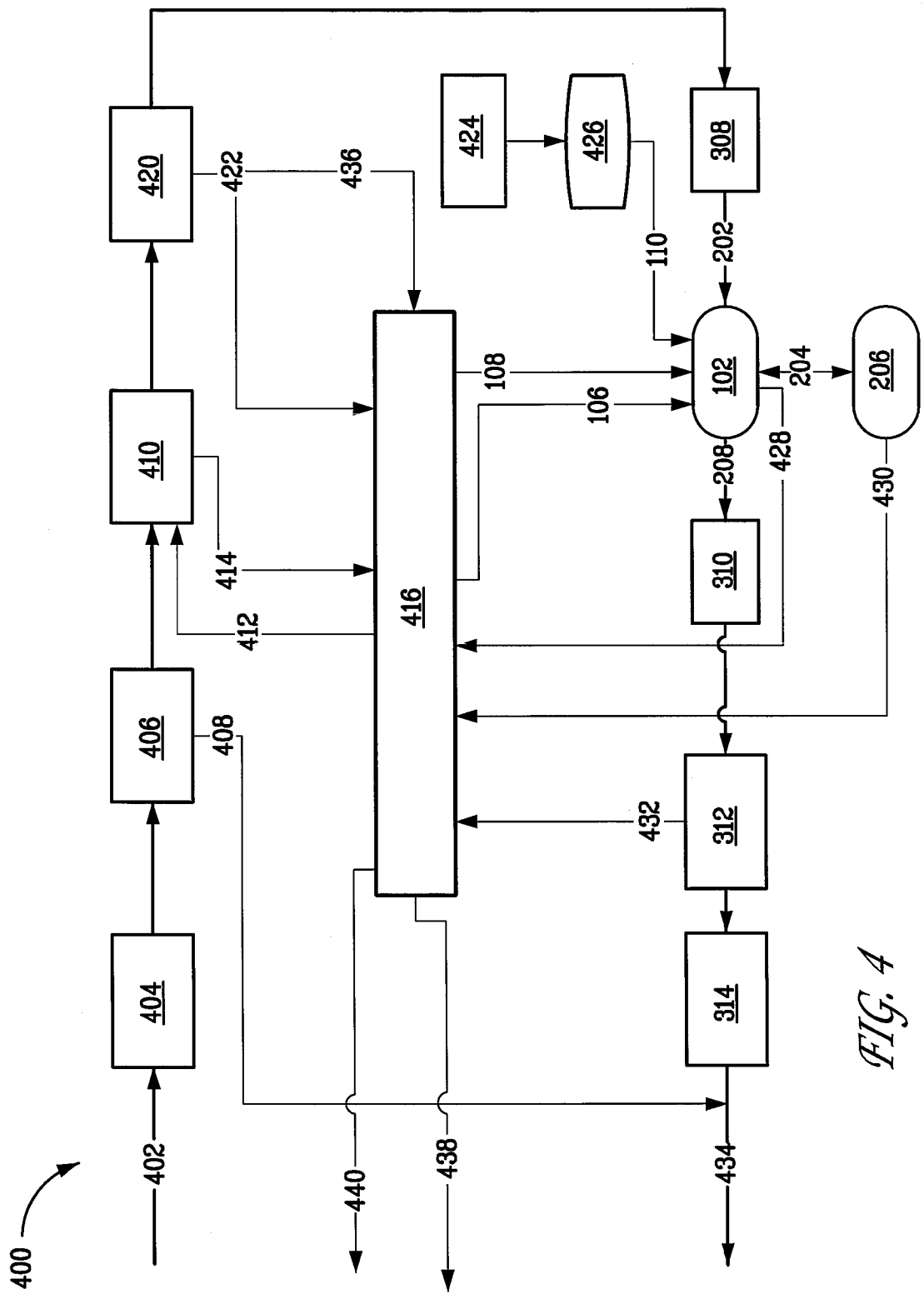
FIG. 4 depicts a further embodiment of a system for upgrading carbonaceous material including but not limited to a processor, an energy recovery tank, a wet jig, a centrifuge, an air jig, and a system for recycling process water.

FIG. 4 is a block diagram of an exemplary system 400 capable of upgrading carbonaceous materials. The system 400 may include a processor 102 for reducing the water content in the carbonaceous material. Any or all of the features of the exemplary system 100, the exemplary system 200, or the exemplary system 300 may be incorporated in the exemplary system 400. The carbonaceous material may be provided to the system 400 by, for example, stream 402. Stream 402 is an example of a process stream, and it may reflect a means of transporting carbonaceous material including any or all of the transportation means described herein, include those pertaining to stream 302. The carbonaceous material of stream 402 may be provided, for example, from a natural source of carbonaceous material, for example a coal mine. The carbonaceous material of stream 402 may be provided, for example, from a transportation network delivering carbonaceous material, for example a railroad network delivering coal.

The system 400 may comprise further streams, numbered or unnumbered. Where the streams of system 400 transport carbonaceous material, the carbonaceous material may be transported by any of the aforementioned continuous or batch transportation methods.

The carbonaceous material may be provided by stream 402 to a crusher 404. The crusher 404 may be exemplified by the pre-processor 304 described herein, wherein the pre-processor 304 comprises a crusher. For example, the stream 402 may provide coal on a conveyor belt, and the conveyor belt may feed coal into a crusher 404, wherein the crusher 404 relies upon, for example, rollers to comminute particles of coal.

The carbonaceous material may be provided from the crusher 404 to the screen 406. The screen 406 may also include a working fluid comprising a gas. The screen 406 may also comprise an air jig. The screen 406 may be exemplified by the pre-processor 304 described herein, wherein the pre-processor 304 comprises a screen or an air jig. The screen 406 may provide carbonaceous material of several sizes. Some sizes of carbonaceous material may be more suitable for further processing than other. Furthermore, some amount of carbonaceous material may be diverted from processing in the processor 102 or other aspects of the system 400. For example, a stream 408 may be provided to carry certain carbonaceous forward in the system 400, skipping the processor 102 or certain other aspects of the system 400. For example, where the carbonaceous material is a fuel, it may not be necessary to upgrade all of the fuel, or it may not be economically sound to upgrade all of the fuel. Therefore, the stream 408 may remove some portion of the fuel from the system 400 before unneeded energy is expended upgrading the fuel. For example, stream 408 may deliver certain of the carbonaceous material to a storage and blending facility wherein, for example, upgraded coal is blended with non-upgraded coal, as well as coal having experienced different varieties of upgrading.

The carbonaceous material may be provided from the screen 406 to the wet jig 410. The wet jig 410 may be exemplified by the pre-processor 304 described herein, wherein the pre-processor 304 comprises a wet jig. The wet jig 410 may be provided a stream 412, wherein the stream 412 provides a working fluid for the wet jig 410. For example, stream 412 may provide process water to the wet jig 410. The wet jig may provide an output stream 414. The wet jig may produce used process water comprising water and materials washed from the carbonaceous materials. These materials may include, for example, ash and sulfur. The process water may also comprise solid particles of ash or carbonaceous material entrained in the liquid. The stream 414 may be capable of transporting any of these outputs away from the wet jig.

A system 416 may be provided to serve various aspects of the system 400. For example, the system 416 may produce as an output stream 412. For example, the system 416 may accept as an input stream 414. The system 416 may, for example, provide working fluids, accept working fluids, and recycle working fluids. The system 416 may, for example, be a process water recycling system. The system 416 may, for example, comprise one or more of each of the following or combinations thereof: a water supply, a boiler, a heat exchanger, a storage tank, a slurry tank, a slurry press, a solid waste removal stream, a liquid waste removal stream, waste treatment systems, streams for transporting steam, streams for transporting water, streams for transporting slurries, and the like.

For example, the system 416 may comprise a water supply providing water to a boiler. The boiler may provide steam to various aspects of the system 400, including but not limited to the processor 102. The system 416 may comprise heat exchangers allowing warm streams to contact cool streams, transferring heat and thereby conserving energy where possible. The system 416 may comprise tanks including one or more ports for admitting process water, and one or more ports for outputting process water, and one or more ports for outputting slurry, or blowdown. The system 416 may be adapted to handle any variety of contaminants or pollutants or other constituents arising from the upgrading of carbonaceous materials. For example, system 416 may comprise components designed to process sulfur, mercury, sodium, chlorides, arsenic, selenium, heavy metals, organic waste, inorganic waste, and other waste products.

The wet jig 410 may provide carbonaceous material to a centrifuge 420. The centrifuge 420 may be exemplified by the pre-processor 304 described herein, wherein the pre-processor 304 comprises a centrifuge. The centrifuge 420 may produce liquids or solid particles, or mixtures thereof, including process water or carbonaceous material entrained in process water. The liquids or solid particles or mixtures thereof produced by the centrifuge 420 may be provided to stream 422. Stream 422 may provide the output of the centrifuge to the system 416. For example, the stream 422 may be fed to a heat exchanger wherein the energy in the stream 422 may be used to heat another stream in the system 416. For example, the stream 422 may be fed to a tank, where, for example, the solid particles may settle to the bottom of the tank, and process water may be drawn from the top of tank entraining less solid material.

All of the pre-processing units 404, 406, 410, and 420 may operate in concert with each other and in concert with the system 416 to provide a mechanism for pre-processing carbonaceous material provided by stream 402, and ultimately providing the carbonaceous material to the loader 308.

The centrifuge 420 may provide carbonaceous material to a loader 308. Generally, the system 400 may include a processor 102 for reducing the water content in the carbonaceous material. For example, the streams 106, 108, 110, and 204 may incorporate any or all of the aforementioned features and examples ascribed those or similar components. Likewise, the energy recovery tank 206 may, in the context of exemplary system 300, incorporate any or all of the aforementioned features. Further, the loader 308 and unloader 310 of the system 300 may be incorporated into the system 400 in concert with the processor 102. For example, coal may be provided by the centrifuge 420. The coal may be loaded into a carts in the loader 308. The coal may be provided by an input mechanism 202, for example a railed conveyance, to the processor 102. Following processing, the coal may be provided an output 208, for example, a railed conveyance, to an unloader 310. The unloader 310 may then provide the coal to a centrifuge 312, for example by unloading the coal from carts and onto a conveyer belt.

Compressed working fluids may be provided in the system by a compressor 424. For example, the working fluid may be a gas, such as air. The compressor 424 may be capable of pressurizing a gas up to a pressure of about 3000 psig. The compressor may provide the gas to a storage tank 426, which may store the gas at pressure of up to about 3000 psig. The storage tank 426 may then provide the compressed gas through stream 110 to the processor 102. For example, the storage tank 426 may be connected to one or more valves and one or more regulators, so that the pressure of the gas traveling to the processor may be controlled. By controlling the pressure of the gas provided by stream 110, the pressure of the atmosphere in the processor 102 may likewise be controlled.

The processor 102 may provide a stream 428. Stream 428 may be provided to the system 416. For example, the stream 428 may carry working fluid away from the processor 102. For example, the stream 428 may carry process water, or process water entraining solids away from the processor 102. Stream 428 may be provided as an input to a storage tank. For example, process water provided to the storage tank by stream 428 may have entrained within it solid particles, for example carbonaceous material. The solid particles may settle in a storage tank of the system 416, and the process water may be drawn from the top containing a reduced amount of solid particles.

The energy recovery tank 206 may provide a stream 430. Stream 430 may comprise any of the same aspects as stream 428. For example, stream 430 may carry process water and entrained solid carbonaceous material away from the energy recovery tank 206 to the system 416, where the process water may be recycled in the aforementioned manner.

The centrifuge 312 may provide a stream 432. Stream 432 may comprise any of the same aspects as stream 428. For example, stream 432 may carry process water and entrained solid carbonaceous material away from the centrifuge 312 to the system 416, where the process water may be recycled in the aforementioned manner.

Any of the systems 100, 200, 300, or 400 may be combined with further elements for processing carbonaceous materials, or processing working fluids including gases and liquids, or processing waste products, or processing feedstock. Any of the systems 100, 200, 300 or 400 may further comprise a furnace, for combusting carbonaceous material treated or upgraded by any part or all of any of systems 100, 200, 300, or 400. For example, the carbonaceous material treated by the processor 102 may be combusted in a furnace. In another aspect disclosed herein, the furnace combusting carbonaceous material may be connected to a boiler for generating steam. In yet another aspect disclosed herein, the steam produced by the boiler may be used to turbine. In a still further aspect disclosed herein, the turbine may be connected to a generator. For example, the aforementioned components furnace, boiler, turbine, and generator may act in concert so as to convert the chemical energy within the carbonaceous material into electrical energy produced by the generator.

Any of the systems 100, 200, 300, or 400 may be designed for simple modularization or skidding, including the processor 102 and any appurtenances. For example, the modularized systems of this invention may be built in a factory, and shipped by truck, rail, or boat to the site where the system may be operated. As a result, the construction time and deployment cost may be reduced. Central manufacturing may also serve to reduce the time to manufacture processors 102 and an appurtenances. For example, processors 102 may be manufactured in less than about 8 months.

Apparatuses

Figure 5:
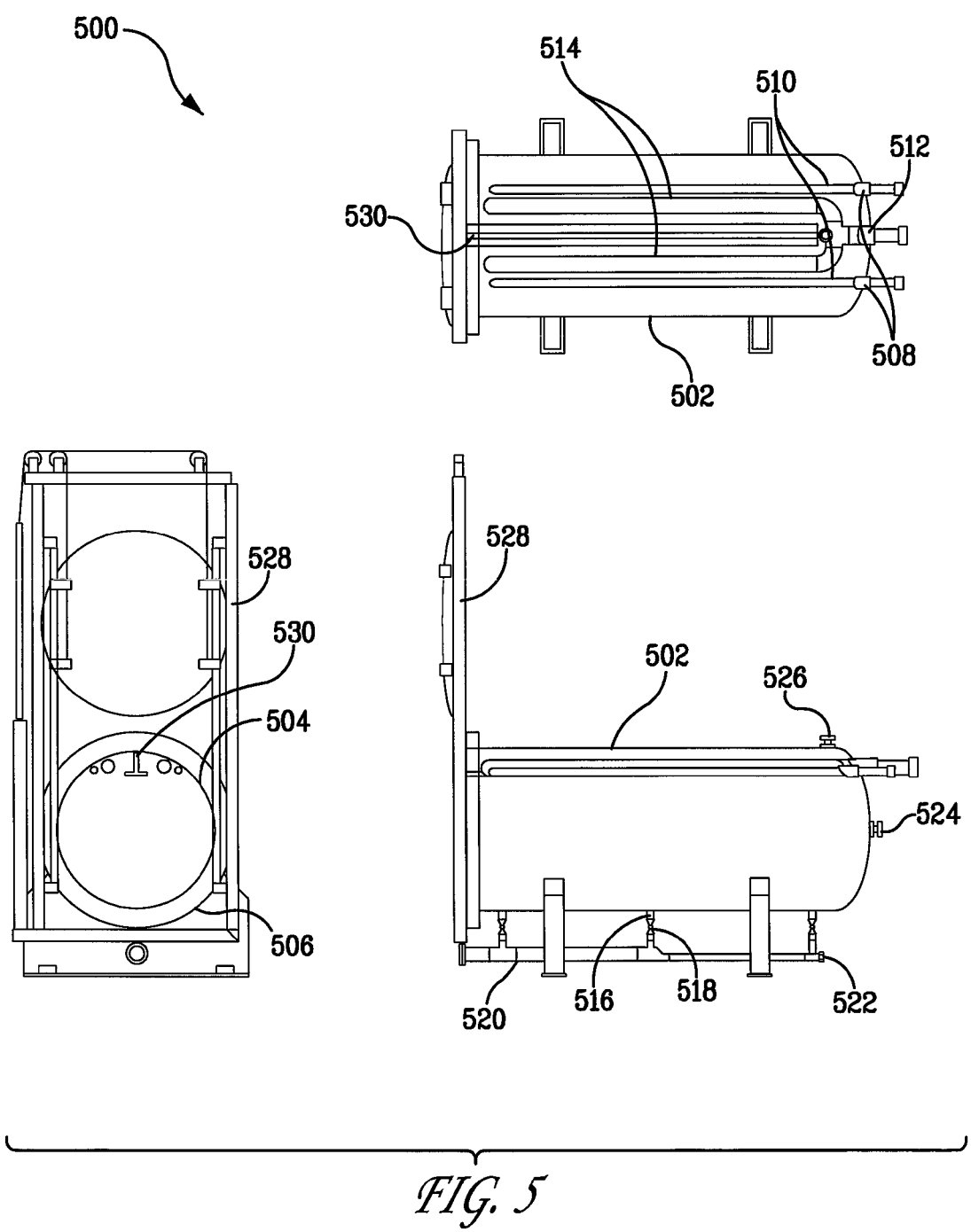
FIG. 5 depicts an embodiment of an apparatus for upgrading carbonaceous material, including but not limited to a vessel with one hatch.

FIG. 5 is a diagram of an exemplary apparatus 500 for use in, among other things, upgrading carbonaceous materials. The apparatus 500 may reflect one example of the processor 102. The apparatus 500 may include a vessel, capable of withstanding superatmospheric pressure. The apparatus 500 may be suitable for upgrading carbonaceous material, for example, in accordance with the methods disclosed herein. The apparatus 500 may be suitable for incorporation, for example, into the systems disclosed herein.

One aspect of the apparatus 500 may be a vessel 502. The vessel 502 may provide the structure necessary to withstand and contain superatmospheric pressure. The vessel 502 may be disposed horizontally on the ground. For example, the vessel 502 may be supported by a base, struts, a platform, or other suitable means. The vessel 502 may be incorporated into a larger structure, such as a movable platform or non-movable platform, which may incorporate further apparatuses in combination with the apparatus 500. For example, the vessel 502 may be made of steel, carbon steel, stainless steel, or other alloys suitable for high pressure vessels. The vessel 502 may comprise one or more segments, including, for example, a cylindrical shell and one or two spherical end caps. For example, the vessel 502 may comprise a cylindrical shell and one spherical end cap and one hatch. For example, the vessel 502 may comprise a cylindrical shell and two hatches.

In some aspects disclosed herein, it may be desirable to minimize the number of moving parts in the interior of the processor 102. For example, the vessel 502 may have few or no moving parts in its interior. For example, the vessel 502 may be implemented without a conveyor belt, screw, or continuously operating airlock. For example, the vessel 502 may be implemented with no moving parts. For example, the vessel 502 may be implemented with moving parts reflected only by one or more wheels incorporated into conveyances moving carbonaceous material.

The vessel 502 may be whatever size necessary to accommodate a desired amount of carbonaceous material. Limitations of energy efficiency, materials strength, and cost may impact the choice of vessel size. For example, the vessel 502 may comprise circular or substantially circular cross-section, and for example the vessel 502 may have a diameter of between about 1 foot and about 20 feet, for example about 8 feet. For example, the vessel may be between about 6 feet long and about 150 feet long, for example about 70 feet long. For example, the walls of the vessel may be between about ¼ inch thick and about 3 inches thick, for example about 1 inch thick. The thickness of the walls of the vessel may depend in part on the superatmospheric pressure desired, as well as on materials limitations, cost, and safety considerations. For example, if the vessel is meant to sustain superatmospheric pressures of up to about 1000 psig, the walls of the vessel may be about 1 inch thick. For example, the vessel may be capable of processing between about 30 and about 60 tons of feedstock and producing between about 15 and about 50 tons of product, in each batch. In further examples, the vessel may be between about 20 feet long and about 150 feet long. For example, the vessel may be about 95 feet long. As the vessel is made larger, it may process more carbonaceous material in each batch.

In further aspects disclosed herein, the vessel 502 may reflect a pilot scale processor. A pilot scale processor may represent a vessel about 4 feet in diameter and about 10 feet long. For example, a pilot scale processor may process about 1 ton of feedstock in each cycle.

The vessel 502 may have two surfaces, an inner surface 504 and an outer surface 506. The vessel 502 may have one or more openings or ports that may be opened or closed. The openings may connect the outer surface of the vessel to the inner surface of the vessel. By opening or closing openings or ports in the vessel, the environment in the exterior of the vessel may communicate with the environment in the interior of the vessel 502.

For example, an opening or port in the vessel 502 may include one or more openings or ports through which one or more working fluids may be passed. Working fluids may include liquids, such as water or liquid hydrocarbons, gases, such as steam or air, and supercritical fluids such as supercritical carbon dioxide, as well as mixtures thereof. Any one particular opening may be adapted to carry more than one fluid. For example, an opening passing from the outer surface 506 to the inner surface 504 of the vessel 502 may include an opening 508 through which liquids, for example water, may pass. There may be one or more openings 508, for example two openings 508. The opening 508 may, for example, include a hole fabricated in the wall of the vessel, through which a pipe or tube carrying water may pass. The opening 508 may be adapted to or include a valve to control the flow of the fluid through the opening 508.

The fluid passing through the opening 508 may travel into a header 510, disposed in the interior of the vessel 502. The header 510 may be a tube, pipe, or manifold with numerous perforations. For example, the header 510 may comprise a tube, connected to the opening 508. The header 510 may, for example, comprise steel or stainless steel. The header 510 may be attached to the top of the inner surface 504 of the vessel 502. The header 510 may, for example, be attached to the wall of the vessel 502 near or at the opening 508. The header 510 may have at least one inlet, for example the opening 508, and numerous ways for the fluid contents of the header 510 to escape. For example, the header 510 may have numerous perforations through which fluids, for example water, may pass. For example, the header 510 may be filled by water, admitted through the opening 508. The water may then exit the header 510 through the perforations, and enter the main cavity of the vessel, for example showering the contents of the vessel, for example showering carbonaceous material.

In another aspect of the apparatus 500, a port or opening 512 may pass from the outer surface 506 to the inner surface 504 of the vessel 502. The opening 512 may be designed to transmit working fluids into and out of the vessel 502, for example, in a manner similar to opening 508. There may be one or more openings 512, for example two openings 512. The opening 512, may, for example, transmit steam, including steam at superatmospheric pressure, for example saturated steam or superheated steam. The opening 512 may be adapted to or include a valve to control the flow of the fluid through the opening 512.

The fluid passing through the opening 512 may travel into a header 514, disposed in the interior of the vessel 502. The header 514 may comprise, for example, any of the aspects of the header 510. For example the header 514 may comprise a tube with perforations, through which steam may pass. For example, the header 514 may be a gas distribution header adapted for distributing steam. For example, the header 514 may be filled by steam, admitted through the opening 512. The steam may then exit the header 514 through the perforations, and enter the main cavity of the vessel, for example exposing the contents of the vessel to steam. For example, steam of superatmospheric pressure may enter the vessel through the opening 512 and header 514, thereby pressurizing the vessel with steam.

In another aspect of the apparatus 500, a port or opening 516 may pass from the outer surface 506 to the inner surface 504 of the vessel 502. The opening 516 may be designed to transmit working fluids into and out of the vessel 502, for example, in a manner similar to opening 508. There may be one or more openings 516, for example three openings 516. The opening 516, may, for example, transmit steam, water, or other fluids including gases or liquid suspensions, including fluids at superatmospheric pressure. For example, the opening 516 may drain standing liquids in the bottom of the vessel 502, either by gravity or under pressure. The opening 516 may be adapted to or include a valve to control the flow of the fluid through the opening 516.

The fluid passing through the opening 516 may pass through a valve 518, wherein the valve 518 may, for example, be actuated to control the flow of fluid through the opening 516. The opening 516 may further be connected to a manifold 520, either incorporating a valve 518 or not. There may be several valves 518, and where there are several openings 516, they may, for example, connect to the same manifold 520 or multiple manifolds 520. For example, the manifold 520 may be a condensate drain header. For example, the manifold 520 may collect condensate drained from the vessel 502 through three openings 518. The manifold 520 may have a further opening 522 to allow drainage or cleaning of the manifold 520.

In another aspect of the apparatus 500, a port or opening 524 may pass from the outer surface 506 to the inner surface 504 of the vessel 502. The opening 524 may be designed to transmit working fluids into and out of the vessel 502, for example, in a manner similar to opening 508. There may be one or more openings 524. The opening 524, may, for example, transmit steam, water, or other fluids including gases or liquid suspensions, including fluids at superatmospheric pressure. For example, the opening 524 may transmit pressurized gases such as air, nitrogen, oxygen, hydrogen, or mixtures thereof into the vessel 502. The opening 524 may be adapted to or include a valve to control the flow of the fluid through the opening 524. In some cases, the opening 524 may be adapted to a manifold to distribute the fluid passing through the opening 524 into the vessel. For example, the opening 524 may be adapted to a gas distribution header adapted for distributing air. In other cases, the opening 524, for example, may not be attached to a manifold. For example, where the opening 524 transmits air into the vessel, the air may be released directly into the vessel at the point of the opening 524.

In another aspect of the apparatus 500, the opening 526 may pass from the outer surface 506 to the inner surface 504 of the vessel 502. The opening 526 may be designed to transmit working fluids into and out of the vessel 502, for example, in a manner similar to opening 508. There may be one or more openings 526. The opening 526, may, for example, transmit steam, water, or other fluids including gases or liquid suspensions, including fluids at superatmospheric pressure.

For example, the opening 526 may transmit pressurized gases such as air, nitrogen, oxygen, hydrogen, or mixtures thereof out of the vessel 502. For example, the opening 526 may be a vent, allowing the release of any of the contents of the vessel 502. For example, the contents of the vessel 502 may be under pressure, and they may be propelled through the opening 526 by the pressure of the vessel. The opening 526 may be adapted to or include a valve to control the flow of the fluid through the opening 526. The opening 526 may transmit fluids from the vessel 502 directly to the surrounding atmosphere, or the opening 526 may transmit fluids from the vessel 502 to further pipes or process units designed to handle the fluids, for example by recycling them or treating them.

In another aspect of the apparatus 500, the vessel 502 may have one or more openings allowing solid material, for example carbonaceous material, to be placed into and removed from the vessel 502. For example, one end or both ends of the vessel 502 may comprise a door or hatch. For example, one end of the vessel 502 may comprise a hatch 528. The hatch 528 may be designed to open and close quickly. The hatch 528 may be sufficiently strong to withstand superatmospheric pressure. For example, the hatch 528 may be sufficiently strong to withstand a pressure of about 1000 psig. For example, the hatch 528 may be constructed of steel, carbon steel, or stainless steel. The hatch may comprise gaskets and seals necessary to contain superatmospheric pressure.

For example, the hatch 528 may slide into place and seal. The hatch 528 may swing into place, for example along hinges, and seal. The hatch 528 may be actuated manually or by computer control. The hatch 528, may, for example, slide into place under the control of a system of cables and pulleys capable of lifting the hatch into place.

In another aspect of the apparatus 500, the vessel 502 may have, disposed on the inner surface 504, necessary components for operation of a conveyance inside the vessel 502. For example, where the conveyance is a railed conveyance, a rail 530 may be disposed on the inner surface 504. There may be one or more rails 530. The rails may be disposed on the top of the vessel 502, the bottom of the vessel 502, or the side of the vessel 502, or any combination thereof. For example, the rail 530 may be attached to the top of the vessel 502. The rail 530 may be designed as part of an overhead railed conveyance. For example, the rail 530 may be adapted to one or more containers capable of carrying carbonaceous material. The rail 530 may facilitate moving carbonaceous material into and out of the vessel 502 through the hatch 528. The rail 530 may abut another rail outside the vessel, so that railed conveyances may move from inside the vessel 502 to outside the vessel 502 along the rails.

Figure 6:
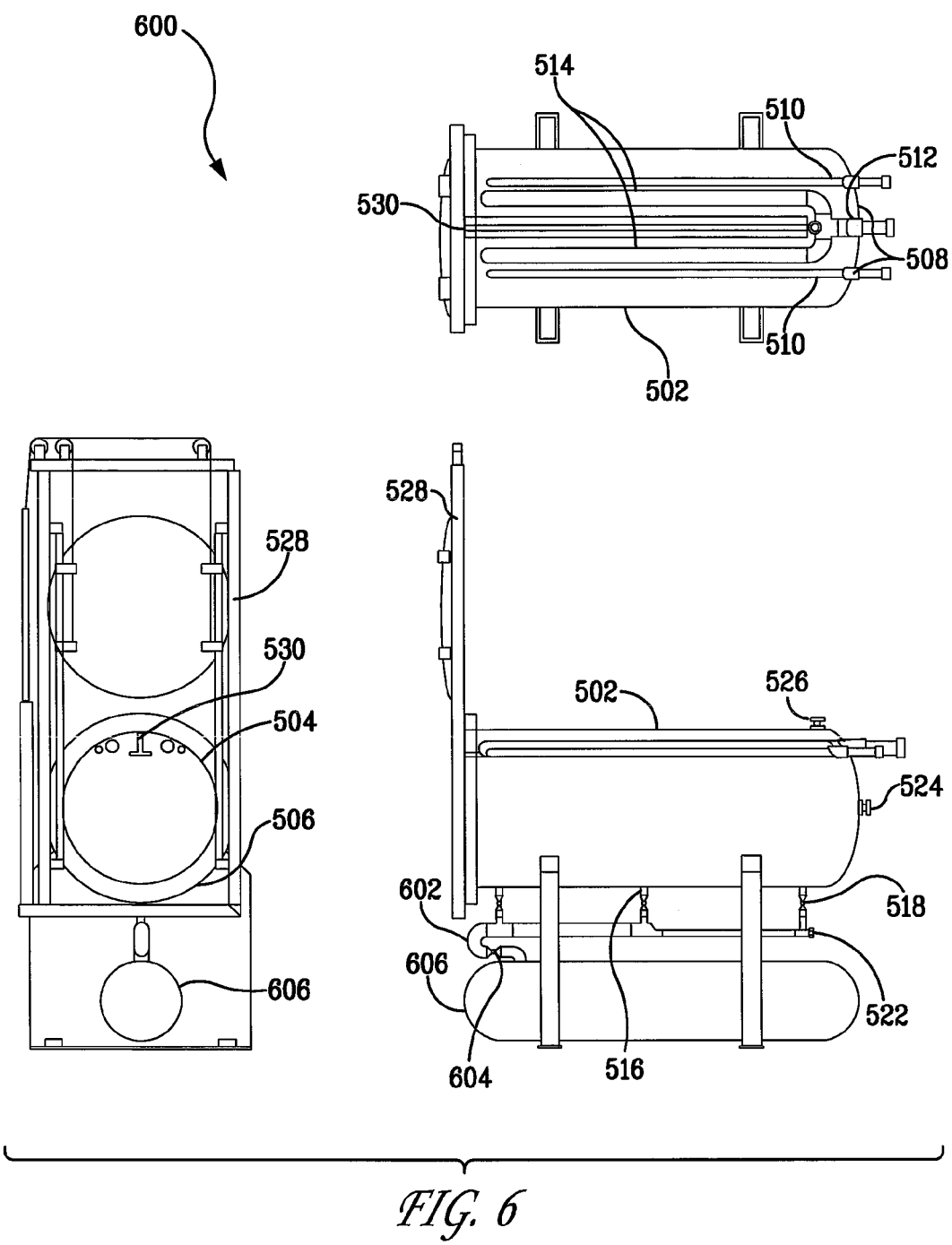
FIG. 6 depicts a further embodiment of an apparatus for upgrading carbonaceous material, including but not limited to a vessel and an energy recovery tank.

FIG. 6 is a diagram of an exemplary apparatus 600 for use in, among other things, upgrading carbonaceous materials. The apparatus 600 may incorporate any or all of the aspects of the apparatus 500, in addition to further aspects. The apparatus 600 may reflect one example of the processor 102. The apparatus 600 may include a vessel, capable of withstanding superatmospheric pressure. The apparatus 600 may be suitable for upgrading carbonaceous material, for example, in accordance with the methods disclosed herein. The apparatus 600 may be suitable for incorporation, for example, into the systems disclosed herein.

In several aspects of the apparatus 600, a manifold 602 is connected to one or more ports or openings 516 in the vessel 502. The manifold 602 may be connected to the opening 516 through a valve 518. The opening 516 may have any or all of the same aspects as the opening 516 in the context of apparatus 500. For example, the opening 516 may drain standing liquids in the bottom of the vessel 502, either by gravity or under pressure, into the manifold 602. For example, the manifold 602 may be a condensate drain header. The manifold 602 may have a further opening 522 to allow drainage or cleaning of the manifold 520.

In further aspects of the apparatus 600, the manifold 602 may be connected to a valve 604, through which the contents of the manifold may pass. For example, the valve 604 may transmit fluids, such as water or steam, out of the manifold 602. Alternatively, the valve 604 may admit fluids, such as water or steam into the manifold 602. For example, the valve 604 may admit steam into the manifold 602 and thereafter the steam may be admitted into the vessel 502.

In further aspects of the apparatus 600, the valve 604 may be connected to an energy recovery tank 606. The energy recovery tank 606 may reflect one example of the energy recovery tank 206. The energy recovery tank 606 may incorporate any or all of the features of the energy recovery tank 206. For example, the energy recovery tank 606 may be a vessel capable of withstanding superatmospheric pressure. For example, the energy recovery tank 606 may be constructed of steel, carbon steel, or stainless steel. The energy recovery tank 606 may be appropriately sized to communicate with a vessel 502 in an energy efficient and physically effective manner. For example, for certain applications, the energy recovery tank 606 may be about 4 feet in diameter, about 35 feet long, and may have walls having a thickness of about 1 inch. The energy recovery tank 606 must be sized appropriately to efficiently communicate fluids between the energy recovery tank 606 and the vessel 502. The energy recovery tank 606 may be composed of a cylindrical shell and one or more spherical end caps, for example two spherical end caps. The energy recovery tank 606 may, for example, weigh about 20,000 lbs.

In further aspects disclosed herein, a pilot scale version of the vessel 502 may incorporate a pilot scale version of the energy recovery tank 606. For example, a pilot scale energy recovery tank may be about 16 inches in diameter and about 14 feet long.

The vessel 502 and the energy recovery tank 606 may be operated in concert, such that fluids may be transmitted from the vessel 502 to the energy recovery tank 606, and from the energy recovery tank 606 to the vessel 502. The fluids transmitted may include liquids, such as water, solutions of water, liquid petroleum compositions, and suspensions including carbonaceous materials suspending in water, and mixtures thereof. The fluids transmitted may include gases, such as steam, air, oxygen, nitrogen, hydrogen, inert gases, and oxidizing gases, and mixtures thereof. The fluids transmitted may include supercritical fluids, including supercritical carbon dioxide. The fluids may be transmitted between the energy recovery tank 606 and the vessel 502 through one or more valves 604 or 518, through one or more manifolds 602, and through one or more openings 516.

Figure 7:
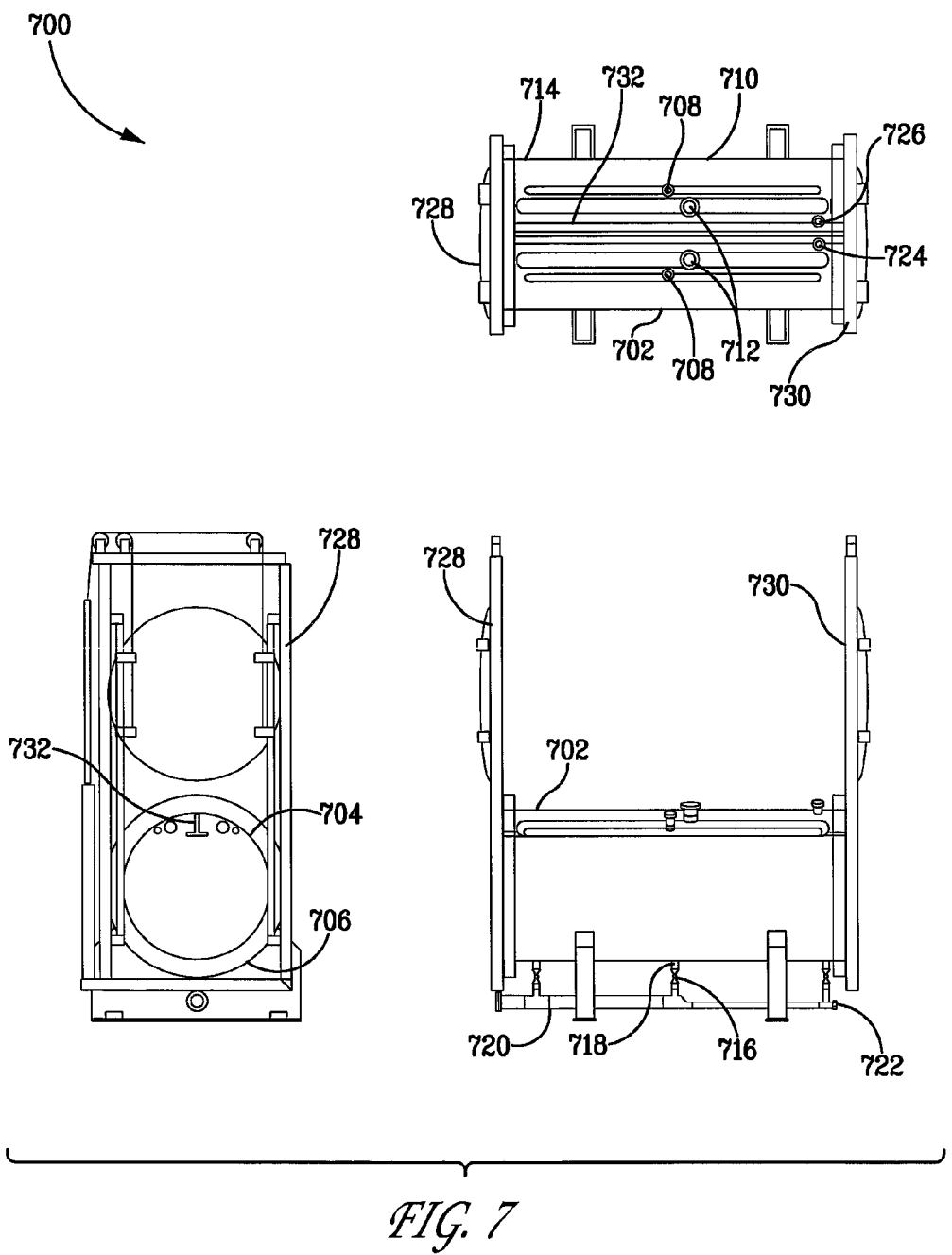
FIG. 7 depicts a further embodiment of an apparatus for upgrading carbonaceous material including but not limited to a vessel with two hatches.

FIG. 7 is a diagram of an exemplary apparatus 700 for use in, among other things, upgrading carbonaceous materials. The apparatus 700 may incorporate any or all of the aspects of the apparatuses 500 and 600, in addition to further aspects. The apparatus 700 may reflect one example of the processor 102. The apparatus 700 may include a vessel, capable of withstanding superatmospheric pressure. The apparatus 700 may be suitable for upgrading carbonaceous material, for example, in accordance with the methods disclosed herein. The apparatus 700 may be suitable for incorporation, for example, into the systems disclosed herein.

One aspect of the apparatus 700 may be a vessel 702. The vessel 702 may provide the structure necessary to withstand and contain superatmospheric pressure. The vessel 702 may be disposed horizontally on the ground. For example, the vessel 702 may be supported by a base, struts, a platform, or other suitable means. The vessel 702 may be incorporated into a larger structure, such as a movable platform or non-movable platform, which may incorporate further apparatuses in combination with the apparatus 700. For example, the vessel 702 may be made of steel, carbon steel, stainless steel, or other alloys suitable for high pressure vessels. The vessel shell 702 may be composed of one or more segments, including, for example, a cylindrical shell and one or two spherical end caps. For example, the vessel 702 may be composed of a cylindrical shell and two hatches.

The vessel 702 may be whatever size necessary to accommodate a desired amount of carbonaceous material. Limitations of energy efficiency, materials strength, and cost may impact the choice of vessel size. For example, the vessel may have a diameter of about 8 feet. For example, the vessel may be about 70 feet long. For example, the walls of the vessel may be about 1 inch thick. The thickness of the walls of the vessel may depend in part on the superatmospheric pressure desired, as well as on materials limitations, cost, and safety considerations. For example, if the vessel is meant to sustain superatmospheric pressures of up to about 1000 psig, the walls of the vessel may be about 1 inch thick.

The vessel 702 may have two surfaces, an inner surface 704 and an outer surface 706. The vessel 702 may have one or more openings or ports that may be opened or closed. The openings may connect the outer surface of the vessel to the inner surface of the vessel. By opening or closing openings or ports in the vessel, the environment in the exterior of the vessel may communicate with the environment in the interior of the vessel 702.

For example, an opening or port in the vessel 702 may include one or more openings or ports through which one or more working fluids may be passed. Working fluids may include liquids, such as water or liquid hydrocarbons, gases, such as steam or air, and supercritical fluids such as supercritical carbon dioxide, as well as mixtures thereof. Any one particular opening may be adapted to carry more than one fluid. For example, an opening passing from the outer surface 706 to the inner surface 704 of the vessel 702 may include an opening 708 through which liquids, for example water, may pass. There may be one or more openings 708, for example two openings 708. The opening 708 may, for example, include a hole fabricated in the wall of the vessel 702, through which a pipe or tube carrying water may pass. The opening

708 may be adapted to or include a valve to control the flow of the fluid through the opening 708.

The fluid passing through the opening 708 may travel into a header 710, disposed in the interior of the vessel 702. There may be one or more openings 708 and one or more headers 710, for example with one opening 708 connected to each header 710. For example there may be two openings 708 and two headers 710. The header 710 may be a tube, pipe, or manifold with numerous perforations. For example, the header 710 may comprise a tube, connected to the opening 708. The header 710 may be, for example, composed of steel or stainless steel. The header 710 may be attached to the top of the inner surface 704 of the vessel 702. The header 710 may, for example, be attached to the wall of the vessel 702 near or at the opening 708. The header 710 may have at least one inlet, for example the opening 708, and numerous ways for the fluid contents of the header 510 to escape. For example, the header 710 may have numerous perforations through which fluids, for example water, may pass. For example, the header 710 may be filled by water, admitted through the opening 508. The water may then exit the header 710 through the perforations, and enter the main cavity of the vessel, for example showering the contents of the vessel, for example showering carbonaceous material.

In another aspect of the apparatus 700, a port or opening 712 may pass from the outer surface 706 to the inner surface 704 of the vessel 702. The opening 712 may be designed to transmit working fluids into and out of the vessel 702, for example, in a manner similar to opening 508. There may be one or more openings 712, for example two openings 712. The opening 712, may, for example, transmit steam, including steam at superatmospheric pressure, for example saturated steam or superheated steam. The opening 712 may be adapted to or include a valve to control the flow of the fluid through the opening 712.

The fluid passing through the opening 712 may travel into a header 714, disposed in the interior of the vessel 702. The header 714 may comprise, for example, any of the aspects of the header 710. There may be one or more headers 714. For example, there may be two openings 712, each connected to a header 714. For example the header 714 may comprise a tube with perforations, through which steam may pass. For example, the header 714 may be a gas distribution header adapted for distributing steam. For example, the header 714 may be filled by steam, admitted through the opening 712. The steam may then exit the header 714 through the perforations, and enter the main cavity of the vessel 702, for example exposing the contents of the vessel 702 to steam. For example, steam of superatmospheric pressure may enter the vessel 702 through the opening 712 and header 714, thereby pressurizing the vessel 702 with steam.

In another aspect of the apparatus 700, a port or opening 716 may pass from the outer surface 706 to the inner surface 704 of the vessel 702. The opening 716 may be designed to transmit working fluids into and out of the vessel 702, for example, in a manner similar to opening 708. There may be one or more openings 716, for example three openings 716. The opening 716, may, for example, transmit steam, water, or other fluids including gases or liquid suspensions, including fluids at superatmospheric pressure. For example, the opening 716 may drain standing liquids in the bottom of the vessel 702, either by gravity or under pressure. The opening 716 may be adapted to or include a valve to control the flow of the fluid through the opening 716.

The fluid passing through the opening 716 may pass through a valve 718, wherein the valve 718 may, for example, be actuated to control the flow of fluid through the opening 716. The opening 716 may further be connected to a manifold 720, either incorporating a valve 718 or not. There may be several valves 718, and where there are several openings 516, they may, for example, connect to the same manifold 720 or multiple manifolds 720. For example, the manifold 720 may be a condensate drain header. For example, the manifold 720 may collect condensate drained from the vessel 702 through three openings 518. The manifold 720 may have a further opening 722 to allow drainage or cleaning of the manifold 720.

In another aspect of the apparatus 700, a port or opening 724 may pass from the outer surface 706 to the inner surface 704 of the vessel 702. The opening 724 may be designed to transmit working fluids into and out of the vessel 702, for example, in a manner similar to opening 708. There may be one or more openings 724. The opening 724, may, for example, transmit steam, water, or other fluids including gases or liquid suspensions, including fluids at superatmospheric pressure. For example, the opening 724 may transmit pressurized gases such as air, nitrogen, oxygen, hydrogen, or mixtures thereof into the vessel 702. The opening 724 may be adapted to or include a valve to control the flow of the fluid through the opening 724. In some cases, the opening 724 may be adapted to a manifold to distribute the fluid passing through the opening 724 into the vessel. For example, the opening 724 may be adapted to a gas distribution header adapted for distributing air. In other cases, the opening 724, for example, may not be attached to a manifold. For example, where the opening 724 transmits air into the vessel, the air may be released directly into the vessel at the point of the opening 724.

In another aspect of the apparatus 700, the opening 726 may pass from the outer surface 706 to the inner surface 704 of the vessel 702. The opening 726 may be designed to transmit working fluids into and out of the vessel 702, for example, in a manner similar to opening 708. There may be one or more openings 726. The opening 726, may, for example, transmit steam, water, or other fluids including gases or liquid suspensions, including fluids at superatmospheric pressure.

For example, the opening 726 may transmit pressurized gases such as air, nitrogen, oxygen, hydrogen, or mixtures thereof out of the vessel 702. For example, the opening 726 may be a vent, allowing the release of any of the contents of the vessel 702. For example, the contents of the vessel 702 may be under pressure, and they may be propelled through the opening 726 by the pressure inside the vessel 702. The opening 726 may be adapted to or include a valve to control the flow of the fluid through the opening 726. The opening 726 may transmit fluids from the vessel 702 directly to the surrounding atmosphere, or the opening 726 may transmit fluids from the vessel 702 to further pipes or process units designed to handle the fluids, for example by recycling them or treating them.

In another aspect of the apparatus 700, the vessel 702 may have one or more openings allowing solid material, for example carbonaceous material, to be placed into and removed from the vessel 702. For example, one end or both ends of the vessel 702 may comprise a door or hatch. For example, one end of the vessel 702 may comprise a hatch 728. The hatch 728 may be designed to open and close quickly. The hatch 728 may be sufficiently strong to withstand superatmospheric pressure. For example, the hatch 728 may be sufficiently strong to withstand a pressure of about 1000 psig. For example, the hatch 728 may be constructed of steel, carbon steel, or stainless steel.

For example, the hatch 728 may slide into place and seal. The hatch 728 may swing into place, for example along hinges, and seal. The hatch 728 may be actuated manually or by computer control. The hatch 728, may, for example, slide into place under the control of a system of cables and pulleys capable of lifting the hatch into place.

In further aspects of the apparatus 700, the vessel 702 may have two openings allowing solid material, for example carbonaceous material, to be placed into and removed from the vessel 702. For example, each end of the vessel 702 may comprise a hatch. For example, one end of the vessel 702 may comprise a hatch 728, and the other end of the vessel 702 may comprise a hatch 730. The hatch 730 may be designed to open and close quickly. The hatch 730 may be sufficiently strong to withstand superatmospheric pressure. For example, the hatch 730 may be sufficiently strong to withstand a pressure of about 1000 psig. For example, the hatch 730 may be constructed of steel, carbon steel, or stainless steel.

For example, the hatch 730 may slide into place and seal. The hatch 730 may swing into place, for example along hinges, and seal. The hatch 730 may be actuated manually or by computer control. The hatch 730, may, for example, slide into place under the control of a system of cables and pulleys capable of lifting the hatch into place.

In another aspect of the apparatus 700, the vessel 702 may have, disposed on the inner surface 704, necessary components for operation of a conveyance inside the vessel 702. For example, where the conveyance is a railed conveyance, a rail 732 may be disposed on the inner surface 704. There may be one or more rails 732. The rails may be disposed on the top of the vessel 702, the bottom of the vessel 702, or the side of the vessel 702, or any combination thereof. For example, the rail 732 may be attached to the top of the vessel 702. The rail 732 may be designed as part of an overhead railed conveyance. For example, the rail 732 may be adapted to one or more containers capable of carrying carbonaceous material. The rail 732 may facilitate moving carbonaceous material into and out of the vessel 702 through the hatch 728. The rail 732 may likewise facilitate moving carbonaceous material into and out of the vessel 702 through the hatch 730. The rail 732 may, for example, facilitate moving carbonaceous material into the vessel through hatch 728, and out of the vessel through hatch 730. The rail 732 may abut another rail outside the vessel, so that railed conveyances may move from inside the vessel 702 to outside the vessel 702 along the rails.

Figure 8:
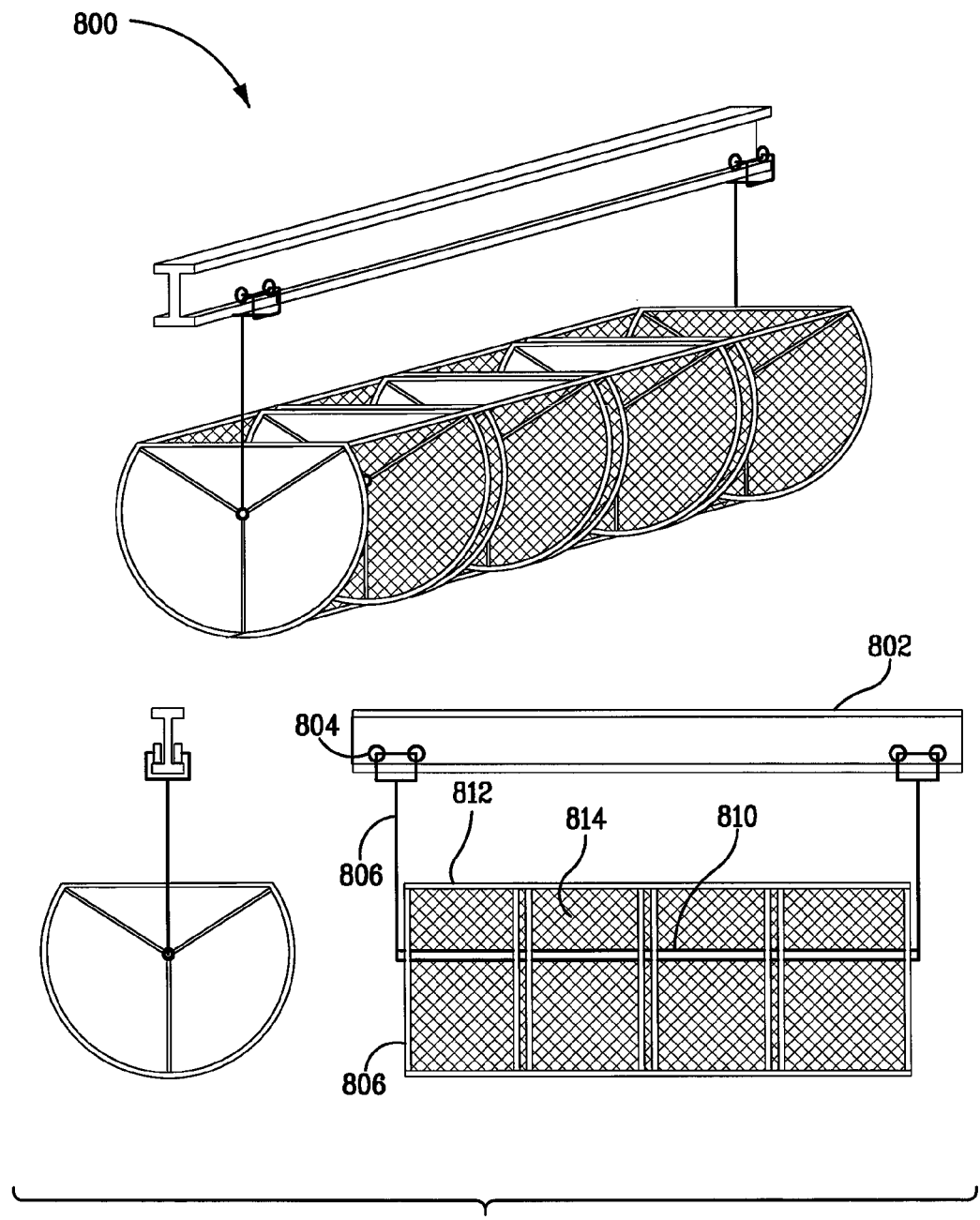
FIG. 8 depicts an embodiment of an apparatus for conveying carbonaceous material including but not limited to an overhead railed conveyance.

FIG. 8 is a diagram of an exemplary apparatus 800 for use in, among other things, upgrading carbonaceous materials, or transporting carbonaceous materials. The apparatus 800 may reflect one example of a railed conveyance suitable for use with the processor 102.

In several aspects of apparatus 800, the apparatus comprises a railed conveyance. In several aspects of apparatus 800, the apparatus comprises a rail 802. The rail 802 may be constructed of steel, carbon steel, stainless steel, or other material suitable for incorporation into a railed conveyance. The rail may be of whatever length is necessary, depending on the distance the conveyance must travel, and the rail may be incorporated into junctions, switches, loading zones, unloading zones, or other adaptations. The rail 802 may, for example, have the cross-section of an I-beam. The apparatus 800 may comprise one rail 802. The apparatus 800 may comprise a plurality of rails 802, for example two rails 802.

In several aspects of the apparatus 800, one or more wheels may ride along the rail 802. For example, the rail 802 may have the cross-section of an I-beam, thereby allowing one or more wheels to ride along the horizontal surfaces of the I-beam. For example, a head 804 may move along the rail 802. For example, the head 804 may be a structure comprising one or more wheels, for example two wheels or four wheels, arranged so that the wheels may move along the horizontal surface of the I-beam. A variety of wheel arrangements in the head 804 may allow the head to move along the rail 802. For example, one or more wheels may be vertically disposed, and one or more wheels may be horizontally disposed, moving along, for example, the vertical surface of the I-beam.

In further aspects of the apparatus 800, a railed conveyance may comprise one head. In further aspects of the apparatus 800, a railed conveyance may comprise a plurality of heads. For example, a railed conveyance may comprise two heads.

In several aspects of the apparatus 800, a structural member 806 may be connected to the head 804. The structural member 806 may be, for example, constructed of steel, carbon steel, or stainless steel. The structural member 806 may be a stiff member, or a flexible member, such as a cable. The structural member 806 may have an upper end and a lower end. For example, the upper end of the structural member 806 may be attached to the head 804, and the lower end of the structural member 806 may hang down below the head 804. The apparatus 800 may comprise one structural member 806. The apparatus 800 may comprise a plurality of structural members 806, for example two structural members 806. Each head 804 may be attached to one or more structural members 806, for example one structural member 806.

In further aspects of the apparatus 800, a structural frame 808 may be attached to the lower end of the structural member 806. The structural frame may be attached to one or more, or all, of the structural members 806. The structural frame may comprise components necessary to hold, carry, or transport carbonaceous material. For example, the structural frame may comprise an axel 810. The axel 810 may comprise a structural element, for example a rod. The axel 810 may be connected to the structural members at one or more points, for example, two points. For example, the axel 810 may be connected to the structural members 806 at three, four, or five points. The axel 810 may be connected to some or all of the structural members. The axel 810 may be solid or hollow. The axel 810 may, for example, have a circular or substantially circular cross section, square cross section, or elliptical cross section. At the points the axel 810 connects to the structural members, the axel may, for example, be capable of rotating. For example, the axel 810 may freely rotate through holes in the lower ends of the structural members 806. The axel may be of whatever size is necessary to hold a container of desired size. For example, the axel may be about 8 feet long.

In further aspects of the apparatus 800, a structural frame 808 may comprise a structural support 812. The structural support 812 may be connected to the axel 810 at one or more locations along the length of the axel 810, for example 8 locations. The structural support 812 may be connected to the axel 810 in a fixed manner, so that when the axel 810 is rotated the structural support 812 rotates as well. The structural support 812 may connected to the axel 810 in a rotatable manner, so that the structural support 812 may be rotated around the axel 810.

The structural support 812 may comprise a plurality of elements connected in an arrangement to form the outline of the outer surfaces of a container. For example, the structural support 812 may comprise struts extending radially outward from the axel 810. For example, the structural support 812 may comprise loops connecting the outer ends of the struts to form the perimeter of the container. For example, the structural support 812 may comprise struts connecting the loops, forming the axial perimeter of the container. In combination, the elements forming the structural support 812 may be capable of supporting the surface of the container. For example, the width of the perimeter of the container may be between about 3 feet and about 10 feet, for example between about 6 feet and about 7 feet.

The structural support 812 may comprise elements arranged to form the outline of one or more containers, for example four containers, or seven containers. For example, there may be containers of an axial length of between about 6 inches and about 24 inches. Where the structural support 812 comprises the outlines of several containers, there may be a gap between each container. For example, the gaps may have an axial length of between about ½ inch and about 2 inches. Some containers may be larger than others, where the smaller containers represent the gaps between the larger containers. The structural support 812 may comprise a substantially circular-cross section. For example, the structural support 812 may comprise a circular-cross section, or a portion of a circular cross-section. For example, the structural support 812 may comprise the lower part of a circular cross-section.

In further aspects of the apparatus 800, the structural support 812 may support one or more surfaces 814. The containers outlines by the structural support 812 may have their surfaces formed by the surfaces 814. For example, the surface 814 may attach to one or more points of the structural support 812, and may form containers capable of holding carbonaceous material. For example, the surface 814 may cover the lower portions of the structural support 812. For example, the surface 814 may not cover an upper portion of the structural support 812, thus allowing access to the container by carbonaceous material.

The material and design of the surface 814 depends upon, among other things, the carbonaceous material that may be supported by the surface 814. For example, it may be desirable to support the carbonaceous material having particles above a certain size, but to allow fluids to contact the carbonaceous material. Thus, it may, for example, be advantageous to form the surface 814 comprising a plurality of pores, wherein the pores are sufficiently large to allow the substantial transmission of fluids through the surface 814, but sufficiently small to substantially retain the carbonaceous material. For example, the fluid transmitted through the surface may be a liquid, such as water, a gas, such as air or steam, or a supercritical fluid, such as supercritical carbon dioxide.

The carbonaceous material retained by the surface 814 may be, for example, coal, having a particular particle size range. Thus in one example, the surface 814 may be designed with pores have a size somewhat smaller than the size range of the coal particles, but still sufficiently large to allow the passage of steam, water, air, and other fluids through the surface 814. For example, the surface 814 may comprise wire mesh. The wire mesh may be formed of steel, stainless steel, carbon steel, or other suitable alloy. By way of illustration, for example, the pores of the surface 814 may be less than about ⅛ inch of average diameter, so as to substantially retain carbonaceous material having an average particle size of over about ⅛ inch.

The surface 814 may be interchangeable. For example, the structural supports 812 may be designed to adapt to different surfaces 814. The surfaces 814 may, for example, share similar dimensions, but may have different porosities. For example, one surface may have pores of about ¼ inch in diameter, and a second surface may have pores of about ⅛ inch in diameter. The surface 814 may comprise either the first or second surface. For example, the surface 814 may be removable from the structural supports 812, and a different surface 814 may be installable. The installation may be facile, thus allowing carbonaceous materials of different sizes to be transported with substantially the same equipment.

The elements of the apparatus 800 may, for example, act in concert. For example, carbonaceous material may be loaded into containers formed by the structural frame 808 comprising one or more structural supports 812 and one or more surfaces 814. The structural supports may hang on the axel 810, which may in turn hang on the structural members 806, which in turn may hang on the heads 804. The heads 802 may have wheels allowing them to move along the rail 802. Thus, the carbonaceous material may be moved along the rail in this overhead railed conveyance configuration. The carbonaceous material may be unloaded, for example, by rotating the structural frame 808 on the axel, thus allowing the carbonaceous material to spill through an opening in the upper portion of surface 814 forming the containers.

The apparatus 800 may, for example, be used in concert with the processor 102. For example, carbonaceous material may be transported by the apparatus 800 directly into a processor 102. The processor 102 may comprise one or more rails suitable for use with the apparatus 800, so that the carbonaceous material may move into the processor with minimal disturbance. It may be advantageous to move the carbonaceous material quiescently into the processor, so as to avoid, among other things, breaking up the carbonaceous material. Where the surfaces 814 of the apparatus 800 have pores, the carbonaceous material may be retained while the various working fluids of the processor 102 may contact the carbonaceous material.

Figure 9:
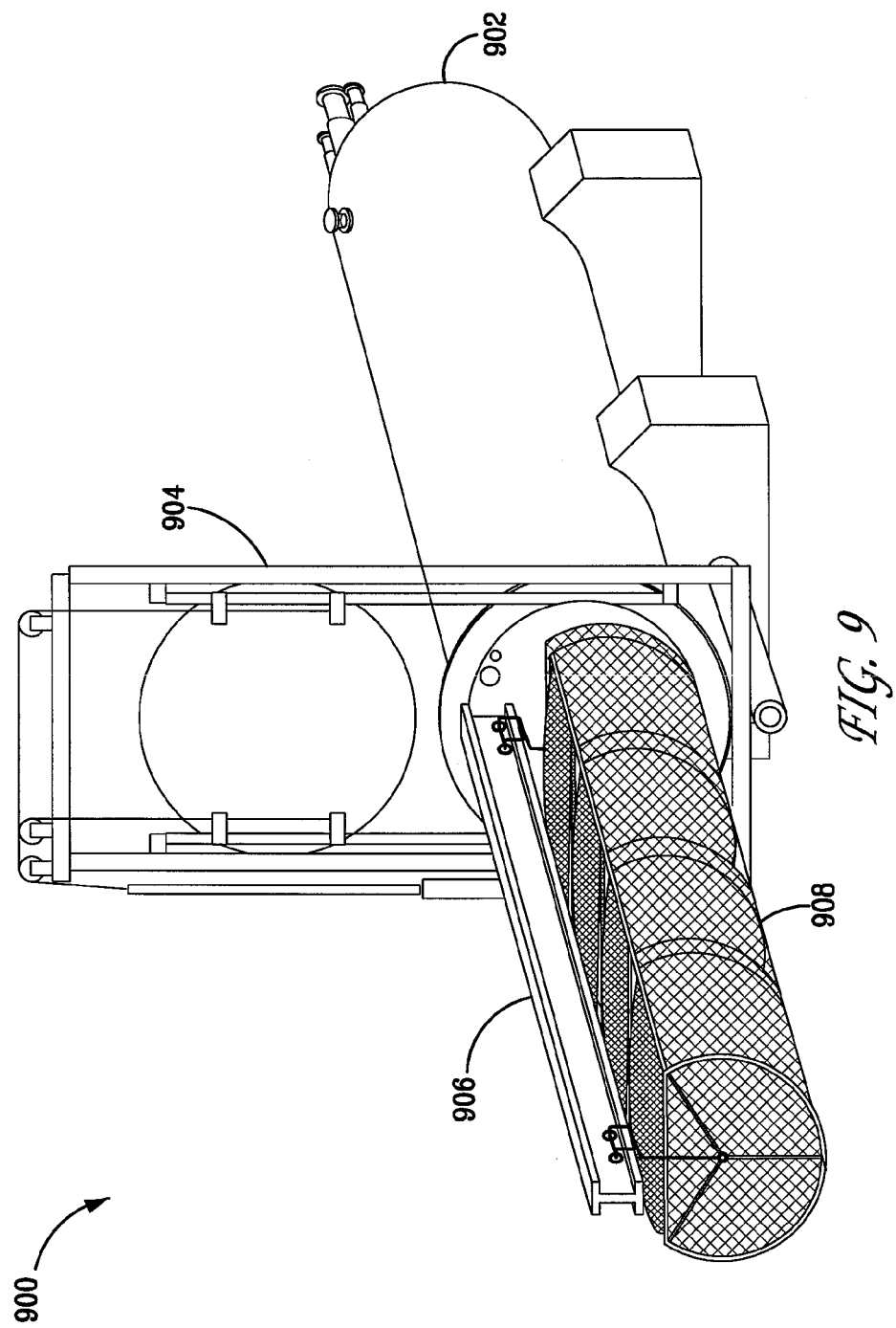
FIG. 9 depicts a further embodiment of an apparatus for upgrading carbonaceous material including but not limited to a vessel and an overhead railed conveyance.

FIG. 9 is a diagram of an exemplary apparatus 900 for use in, among other things, upgrading carbonaceous materials. The apparatus 900 may incorporate any or all of the aspects of the apparatuses 500, 600, and 700, in addition to further aspects. The apparatus 900 may reflect one example of the processor 102. The apparatus 900 may include a vessel, capable of withstanding superatmospheric pressure. The apparatus 900 may be suitable for upgrading carbonaceous material, for example, in accordance with the methods disclosed herein. The apparatus 900 may be suitable for incorporation, for example, into the systems disclosed herein.

In several aspects disclosed herein, an overhead railed conveyance may be combined with a processor such as the processor 102, in order to facilitate moving carbonaceous material into and out of the processor. For example, the processor 102 may comprise a vessel 902, capable of withstanding superatmospheric pressure. The vessel 902 may be disposed horizontally, and may have one hatch 904 at one end of the vessel. For example, the vessel 902 may be disposed horizontally, and may have two hatches, one at either of the vessel.

In further aspects disclosed herein, a rail may be disposed on the interior surface of the vessel 902. For example, the rail may be a similar rail to the rail 906 of the overhead railed conveyance. The rail 906 may be adapted to carry a container 908 for holding carbonaceous material, and the container 908 may move along the rail 906. The rail disposed on the interior surface of the vessel 902 may abut the rail 906. For example, the rail disposed on the interior of the surface of the vessel 902 may be separated from the rail 906 by a distance in the range of about ½ inch and about 12 inches. The distance between the rails may be designed such that the hatch 904 may close in the gap between the rails. The distance between the rails may be designed such that a head, moving along the rail, may always be in contact with at least one rail when the head is crossing the gap. For example, the head may comprise two wheels separated by a gap, and the gap between the wheels may be larger than the gap between the rails.

In further aspects disclosed herein, the vessel 902 may have two hatches, one at either end. A rail may be disposed on the interior surface of the vessel 902, and one rail may abut the rail on the interior surface of the vessel 902 on each end of the vessel 902. In this manner, the overhead railed conveyance may shuttle carbonaceous material into one end of the vessel 902, and out of the other end of the vessel 902.

Figure 10:
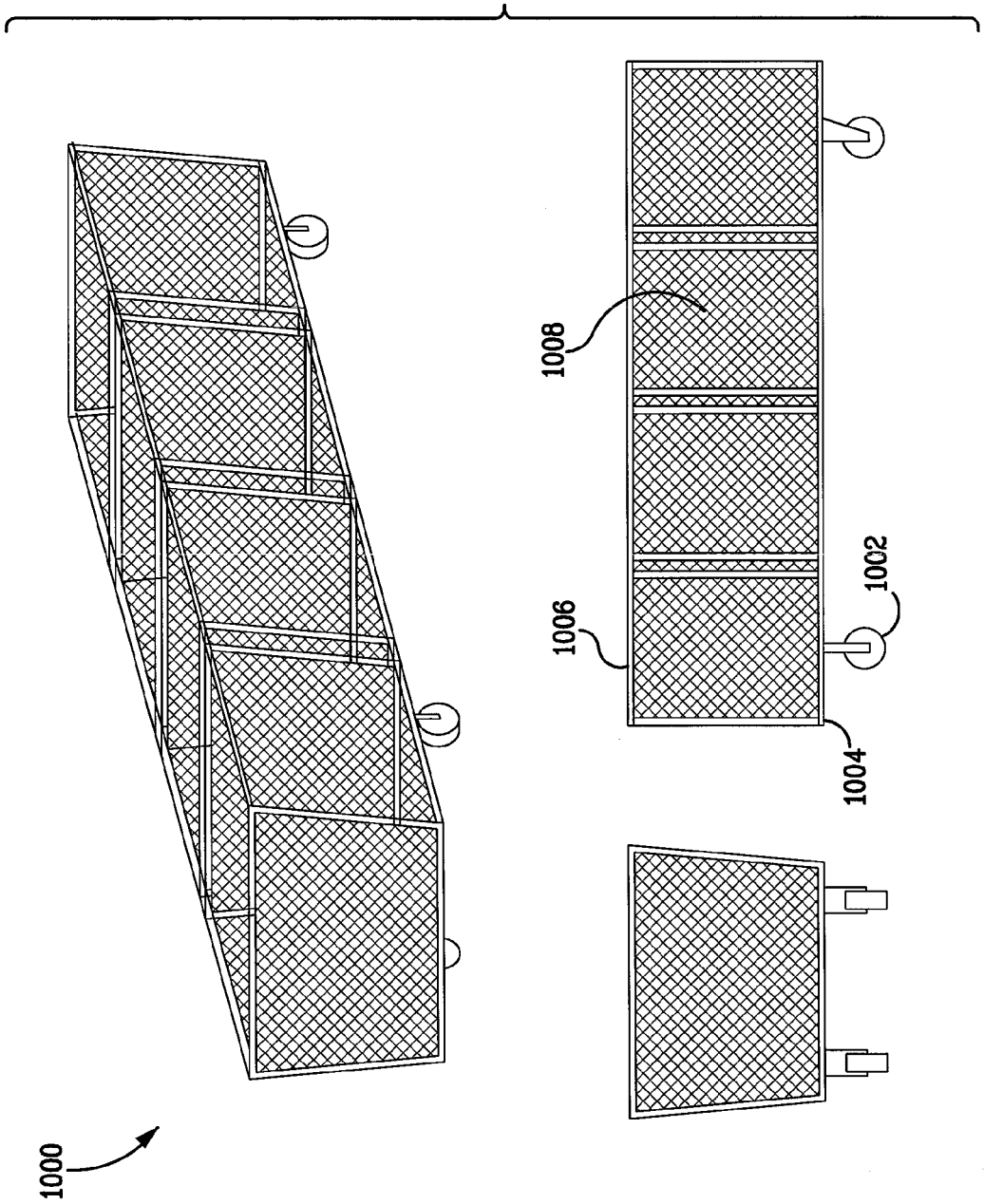
FIG. 10 depicts a further embodiment of an apparatus for conveying carbonaceous material including but not limited to a conveyance.

FIG. 10 is a diagram of an exemplary apparatus 1000 for use in, among other things, upgrading carbonaceous, or transporting carbonaceous materials. The apparatus 1000 may reflect one example of a railed conveyance suitable for use with the processor 102. The apparatus 1000 may also reflect a conveyance suitable for use with the processor 102 without rails.

In several aspects of apparatus 1000, the apparatus comprises a railed conveyance. In several aspects of apparatus 1000, the apparatus comprises rails. The rails may be constructed of steel, carbon steel, stainless steel, or other material suitable for incorporation into a railed conveyance. The rails may be of whatever length is necessary, depending on the distance the conveyance must travel, and the rail may be incorporated into junctions, switches, loading zones, unloading zones, or other adaptations.

In further aspects of the apparatus 1000, the apparatus comprises casters 1002. For example, the apparatus 1000 may comprise four casters 1002. The casters 1002 may rotate, reflecting a swivel caster, and thus facilitating the turning of the apparatus 1000. For example, the casters may comprise wheels. In further aspects of the apparatus 1000, the apparatus comprises casters, wherein the casters may be designed to rotate, not rotate, or be interchangeable by a locking mechanism. In still further aspects of the apparatus 1000, the apparatus comprises rotatable and nonrotatable casters in combination. For example, one end of the apparatus 1000 may comprise two rotatable casters, and the other end of the apparatus 1000 may comprise two nonrotatable casters, reflecting rigid casters. The casters 1002 may move along rails, for example two rails, or they may be adapted to move along the ground or other horizontal surface.

In further aspects of the apparatus 1000, a structural frame 1004 may be attached to the casters 1002. For example, at any sight along the structural frame 1004, a caster 1002 may be attached. A plurality of casters 1002 may be attached to the structural frame 1004. For example, four casters may be attached to the structural frame 1004, for example one caster in each of the four lower corners of the structural frame 1004. The structural frame may comprise components necessary to hold, carry, or transport carbonaceous material.

In further aspects of the apparatus 1000, a structural frame 1004 may comprise a structural support 1006. The structural support 1006 may be connected to the casters at one or more locations, for example 4 locations. The structural support 1006 may comprise a plurality of elements connected in an arrangement to form the outline of the outer surfaces of a container. For example, the structural support 1006 may comprise struts extending horizontally and vertically. For example, the structural support 1006 may comprise struts extending axially along the length of the apparatus 1000. In combination, the elements forming the structural support 1006 may be capable of supporting the surface of the container.

The structural support 1006 may comprise elements arranged to form the outline of one or more containers, for example four containers, or seven containers. Where the structural support 1006 comprises the outlines of several containers, there may be a gap between each container. Some containers may be larger than others, where the smaller containers represent the gaps between the larger containers. The structural support 1006 may comprise a substantially circular-cross section. For example, the structural support 1006 may comprise a circular-cross section, or a portion of a circular cross-section. For example, the structural support 1006 may comprise the lower part of a circular cross-section. In further examples, the structural support 1006 may comprise a square, rectangular, trapezoidal, or other cross-section comprising straight sides. For example, the structural support 1006 may comprise a trapezoidal cross-section wherein the upper edge of the trapezoid is parallel to the lower edge of the trapezoid.

In further aspects of the apparatus 1000, the structural support 1006 may support one or more surfaces 1008. The containers outlines by the structural support 1006 may have their surfaces formed by the surfaces 1008. For example, the surface 1008 may attach to one or more points of the structural support 1006, and may form containers capable of holding carbonaceous material. For example, the surface 1008 may cover the lower portions of the structural support 1006. For example, the surface 1008 may not cover an upper portion of the structural support 1006, thus allowing access to the container by carbonaceous material.

The material and design of the surface 1008 depends upon, among other things, the carbonaceous material that may be supported by the surface 1008. For example, it may be desirable to support the carbonaceous material having particles above a certain size, but to allow fluids to contact the carbonaceous material. Thus, it may, for example, be advantageous to form the surface 1008 comprising a plurality of pores, wherein the pores are sufficiently large to allow the substantial transmissions of fluids through the surface 1008, but sufficiently small to substantially retain the carbonaceous material. For example, the fluid transmitted through the surface may be a liquid, such as water, a gas, such as air or steam, or a supercritical fluid, such as supercritical carbon dioxide.

The carbonaceous material retained by the surface 1008 may be, for example, coal, having a particular particle size range. Thus in one example, the surface 1008 may be designed with pores have a size somewhat smaller than the size range of the coal particles, but still sufficiently large to allow the passage of steam, water, air, and other fluids through the surface 1008. For example, the surface 1008 may comprise wire mesh. The wire mesh may be formed of steel, stainless steel, carbon steel, or other suitable alloy. For example, the pores of the surface 1008 may be less than about ⅛ inch of average diameter, so as to substantially retain carbonaceous material having an average particle size of over about ⅛ inch.

The surface 1008 may be interchangeable. For example, the structural supports 1006 may be designed to adapt to different surfaces 1008. The surfaces 1008 may, for example, share similar dimensions, but may have different porosities. For example, one surface may have pores of about ¼ inch in diameter, and a second surface may have pores of about ⅛ inch in diameter. The surface 1008 may comprise either the first or second surface. For example, the surface 1008 may be removable from the structural supports 1006, and a different surface 1008 may be installable. The installation may be facile, thus allowing carbonaceous materials of different sizes to be transported with substantially the same equipment.

Figure 11:
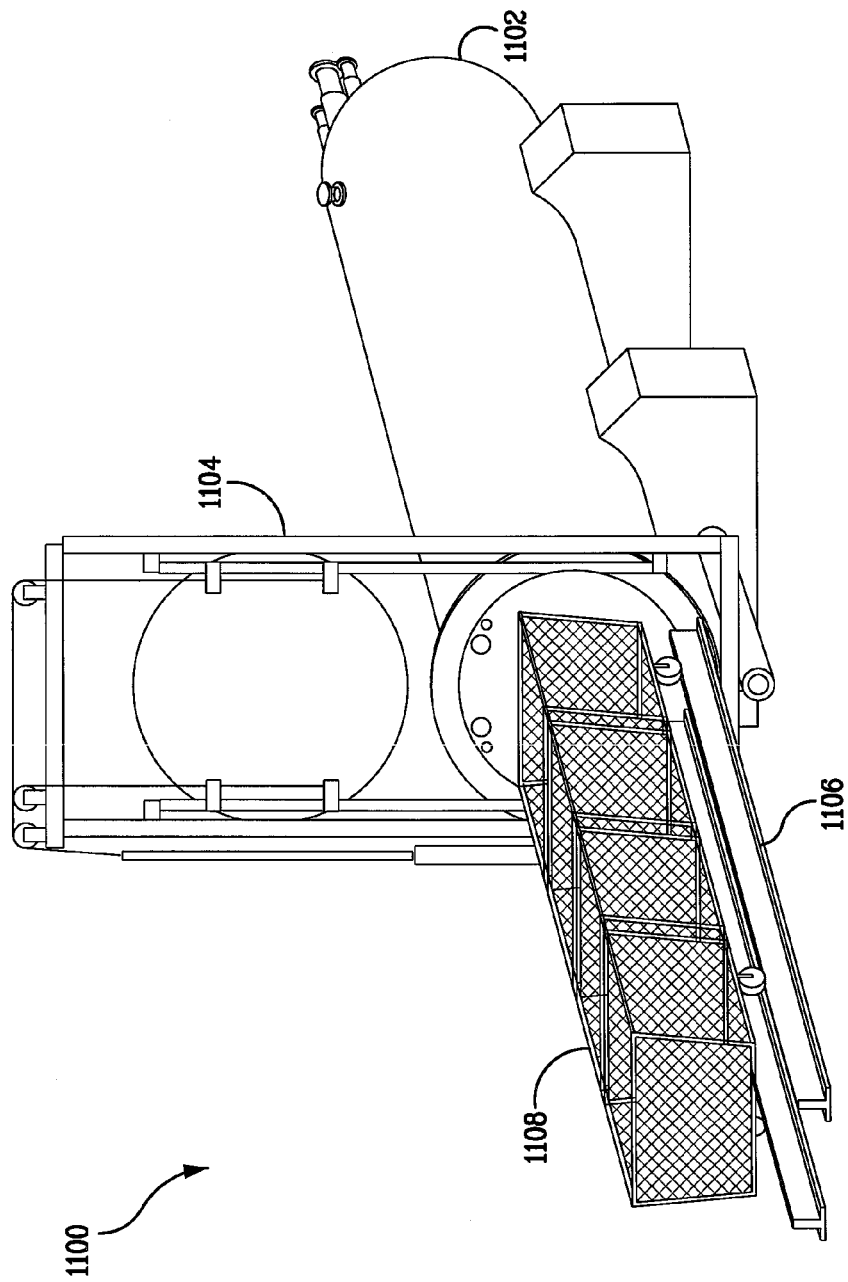
FIG. 11 depicts a further embodiment of an apparatus for upgrading carbonaceous material including but not limited to a vessel and a railed conveyance.

FIG. 11 is a diagram of an exemplary apparatus 1100 for use in, among other things, upgrading carbonaceous materials. The apparatus 1100 may incorporate any or all of the aspects of the apparatuses 500, 600, 700, and 900, in addition to further aspects. The apparatus 1100 may reflect one example of the processor 102. The apparatus 1100 may include a vessel, capable of withstanding superatmospheric pressure. The apparatus 1100 may be suitable for upgrading carbonaceous material, for example, in accordance with the methods disclosed herein. The apparatus 1100 may be suitable for incorporation, for example, into the systems disclosed herein.

In several aspects disclosed herein, a conveyance or railed conveyance may be combined with a processor such as processor 102, in order to facilitate moving carbonaceous material into and out of the processor. For example, the processor may comprise a vessel 1102, capable of withstanding superatmospheric pressure. The vessel 1102 may be disposed horizontally, and may have one hatch 904 at one end of the vessel. For example, the vessel 1102 may be disposed horizontally, and may have two hatches, one at either of the vessel.

In further aspects disclosed herein, one or more rails may be disposed on the interior surface of the vessel 1102. For example, the rails may be similar rails to the rails 1106 of the railed conveyance. For example, there may be two rails 1106, and two rails disposed on the interior surface of the vessel 1102. The rails 1106 may be adapted to carry a container 1108 for holding carbonaceous material, and the container 1108 may move along the rails 1106. The rails disposed on the interior surface of the vessel 1102 may abut the rails 1106. For example, the rails disposed on the interior of the surface of the vessel 1102 may be separated from the rails 1106 by a distance in the range of about ½ inch and about 12 inches. The distance between the rails may be designed such that the hatch 1104 may close in the gap between the rails. The distance between the rails may be designed such that a container 1108, moving along the rails, may always be in contact with at least two rails when the container 1108 is crossing the gap. For example, the container 1108 may comprise four wheels, with a front two wheels separated by a gap from a rear two wheels, and the gap between the front and rear wheels may be larger than the gap between the rails.

In further aspects disclosed herein, the vessel 1102 may have two hatches, one at either end. Rails may be disposed on the interior surface of the vessel 1102, and rails may abut the rail on the interior surface of the vessel 1102 on each end of the vessel 1102. In this manner, the railed conveyance may shuttle carbonaceous material into one end of the vessel 1102, and out of the other end of the vessel 1102.

In still further aspects disclosed herein, a horizontal surface is disposed on the interior of the vessel 1102. For example, the conveyance may move from outside the vessel 1102 to the inside the vessel 1102 by rolling on its wheels along the ground or a platform outside the vessel 1102 and onto the horizontal surface disposed on the interior of the vessel 1102.

EXAMPLES AND FURTHER EMBODIMENTS

Example 1

Coal having a starting weight of 75,000 lbs. is loaded into a trolley. The total moisture content of the coal is 32 percent. Thus, the starting coal dry weight is 51,000 lbs, and the balance comprises water weighing 24,000 lbs. The trolley weighs 15,000 lbs. The starting temperature of the coal and the trolley is 60° F.

Step 1: Water at 200° F. is showered over the coal. As a result, the coal is warmed and the surface of the coal is wetted. The temperature of the coal increases to 150° F.; the temperature of the trolley increases to 150° F.; the temperature of the water decreases to 150° F.; the total moisture of the coal increases to 40 percent; the total weight of the coal increases to 81,000 lbs, including water weighing 30,000 lbs. The total heat requirement is 3,809,700 BTU. The total water requirement for step 1 is 76,194 lbs.

Step 2: The coal is moved from the trolleys to vibrating centrifuges to remove surface moisture. As a result, the coal is dried to a total moisture content of 34 percent. The total weight of the coal decreases to 76,140 lbs, and the total water weight of the coal decreases to 25,140 lbs. 4,860 lbs. of water is drained by the centrifuge.

Step 3: The trolleys are moved into a processor. The processor is an enclosed vessel. After the trolleys containing the coal are moved into the processor, the processor is sealed. The processor is connected to an energy recovery tank. The energy recover tank is charged with residual steam from a prior cycle. The energy recovery tank is vented into the processor, thereby admitting steam into the processor. The energy recovery tank is at a temperature of 470° F. prior to venting, and 212° F. after venting. The flash steam generated is 17.016 percent. The flash steam generated is the percent by weight steam generated by the adiabatic throttling of the water volume isolated in the energy recovery tank whose pressure is reduced from 500 psig to atmospheric pressure. As a result of exposing the coal to steam, the coal water weight decreases to 19,796 lbs.

Step 4: Add further steam to the processor. Steam at 500° F. and 500 psig is injected into the processor. As a result, the coal is dried to a total moisture content of 8 percent. Note that the water lost from the coal during this phase derives mainly from the interior of the coal. The coal water weight decreases to 5,344 lbs. The total coal weight decreases to 56,344 lbs. The coal temperature increases to 500° F. The trolley temperature increases to 500° F. The processor temperature increases to 500° F. The total steam requirement is 20,894 lbs. As a result of the heating with steam, the total energy requirement is 22,223,536 BTU. Note that in a startup cycle, the energy recovery tank is empty and is not vented into the processor. Therefore, more new steam is needed to raise the coal to 500° F. in that situation.

Step 5: Seal the energy recovery tank. The energy recovery tank is closed off from the processor. The steam stored in the tank is reserved for use in the next cycle.

Step 6: Cool the coal. A source of pressurized air connected to the processor is opened and operated to maintain a constant pressure in the processor. A source of water connected to the processor is opened and water is sprayed over the coal. As the processor cools, and the steam inside the processor condenses, compressed air is continually added to maintain a substantially constant pressure. As a result, the moisture content of the coal increases to 18 percent. Note that the water gained by the coal during this phase is accumulated mainly on the surface of the coal. The total coal weight increases to 61,978 lbs. The total water sprayed is 107,957 lbs. The water sprayed is 100° F., and after spraying, the water temperature increases to 200° F. The coal temperature decreases to 100° F. The processor temperature decreases to 300° F. The trolley temperature decreases to 100° F. The total energy requirement is −19,795,665 BTU.

Step 7: Vent the processor. The processor is vented by opening a valve or opening the hatch, or both, to return the pressure inside the processor to atmospheric pressure.

Step 8: Centrifuge the coal. The coal is removed from the processor and placed into a centrifuge. As a result some of the water on the surface of the coal is removed, reducing the total moisture content of the coal to 12 percent. The ending weight of the coal is 58,259 lbs. Thus, the weight of the coal is reduced by the entirety of the process by 16,741 lbs.

Example 2

Coal having a starting weight of 75,000 lbs. is loaded into a trolley. The total moisture content of the coal is 32 percent.

Thus, the starting coal dry weight is 51,000 lbs, and the balance comprises water weighing 24,000 lbs. The trolley weighs 15,000 lbs. The starting temperature of the coal and the trolley is 60° F.

Step 1: Water at 200° F. is showered over the coal. As a result, the coal is warmed and the surface of the coal is wetted. The temperature of the coal increases to 150° F.; the temperature of the trolley increases to 150° F.; the temperature of the water decreases to 150° F.; the total moisture of the coal increases to 40 percent; the total weight of the coal increases to 81,000 lbs, including water weighing 30,000 lbs. The total heat requirement is 3,809,700 BTU. The total water requirement for step 1 is 76,194 lbs.

Step 2: The coal is moved from the trolleys to vibrating centrifuges to remove surface moisture. As a result, the coal is dried to a total moisture content of 34 percent. The total weight of the coal decreases to 76,140 lbs, and the total water weight of the coal decreases to 25,140 lbs. 4,860 lbs. of water is drained by the centrifuge.

Step 3: The trolleys are moved into a processor. The processor is an enclosed vessel. After the trolleys containing the coal are moved into the processor, the processor is sealed. The processor is connected to an energy recovery tank. The energy recover tank is charged with residual steam from a prior cycle. The energy recovery tank is vented into the processor, thereby admitting steam into the processor. The energy recovery tank is at a temperature of 470° F. prior to venting, and 212° F. after venting. The flash steam generated is 17.016 percent. The flash steam generated is the percent by weight steam generated by the adiabatic throttling of the water volume isolated in the energy recovery tank whose pressure is reduced from 500 psig to atmospheric pressure. As a result of exposing the coal to steam, the coal water weight decreases to 19,796 lbs.

Step 4: The energy recovery tank also contains water. The water from the energy recovery tank is discharged through a heat exchanger. The water from the energy recovery tank is at 331° F. before entering the heat exchanger, and 200° F. after entering the heat exchanger. The total amount of water in the energy recovery tank is 37,322 lbs. Therefore, the total energy transferred in the heat exchanger is 4,999,736 BTU.

Step 5: Add further steam to the processor. Steam at 500° F. and 500 psig is injected into the processor. As a result, the coal is dried to a total moisture content of 8 percent. Note that the water lost from the coal during this phase derives mainly from the interior of the coal. The coal water weight decreases to 5,344 lbs. The total coal weight decreases to 56,344 lbs. The coal temperature increases to 500° F. The trolley temperature increases to 500° F. The processor temperature increases to 500° F. The total steam requirement is 20,894 lbs. As a result of the heating with steam, the total energy requirement is 22,223,536 BTU. Note that in a startup cycle, the energy recovery tank is empty and is not vented into the processor. Therefore, more new steam is needed to raise the coal to 500° F. in that situation.

Step 6: Seal the energy recovery tank. The energy recovery tank is closed off from the processor. The steam stored in the tank is reserved for use in the next cycle.

Step 7: Cool the coal. A source of pressurized air connected to the processor is opened and operated to maintain a constant pressure in the processor. A source of water connected to the processor is opened and water is sprayed over the coal. As the processor cools, and the steam inside the processor condenses, compressed air is continually added to maintain a substantially constant pressure. As a result, the moisture content of the coal increases to 18 percent. Note that the water gained by the coal during this phase is accumulated mainly on the surface of the coal. The total coal weight increases to 61,978 lbs. The total water sprayed is 107,957 lbs. The water sprayed is 100° F., and after spraying, the water temperature increases to 200° F. The coal temperature decreases to 100° F. The processor temperature decreases to 300° F. The trolley temperature decreases to 100° F. The total energy requirement is −19,795,665 BTU.

Step 8: Vent the processor. The processor is vented by opening a valve or opening the hatch, or both, to return the pressure inside the processor to atmospheric pressure.

Step 9: Centrifuge the coal. The coal is removed from the processor and placed into a centrifuge. As a result some of the water on the surface of the coal is removed, reducing the total moisture content of the coal to 12 percent. The ending weight of the coal is 58,259 lbs. Thus, the weight of the coal is reduced by the entirety of the process by 16,741 lbs.

Example 3

Coal is withdrawn from storage and travels by belt conveyor to the crusher and is therein sized. The equipment crushes particles which exceed ¾ inch in size. Coal exiting the crusher is sized to 0 inch×¾ inch.

Coal is conveyed to the screen and processed. Screening separates the coal based on particle size. Small particles ("fines") less than ⅛ inch are removed from the coal flow and conveyed to the product storage and blending facility. Screened coal is now sized ⅛ inch×¾ inch.

Coal is conveyed to the wet jig and processed. Coal passes through a water bath of a specified density that causes the desired coal, which is lighter, to be separated from the contaminants, which are heavier. The water used in the wet jig is hot water drawn from a tank in a water recycling system. Accordingly, the wet jig also raises the temperature of the coal to approximately 150° F.

Coal is conveyed to the centrifuge and processed. The centrifuge removes excess surface moisture from the coal using a spinning action. The moisture removed from the coal is piped to a tank in the water recycling system.

Coal handling trolleys are loaded with coal. Trolleys are constructed of a wire mesh to permit moisture removed from the coal during processing to drain from the trolley. The the rolleys are suspended from a monorail. The trolleys travel by monorail into the processor. The vessel door is closed and sealed.

A valve between the processor and energy recovery tank is opened, allowing the pressure and temperature of the two vessels to equalize. The energy recovery tank contains steam condensate and water extracted from the coal during the previous processing cycle, and will be in a state of elevated temperature and pressure. Allowing the two vessels to equalize effectively raises the temperature and pressure in the processor by recovering energy captured during the previous batch. The remaining liquid in the energy recovery tank is drained to a tank in the water recycling system.

Steam from the boiler is delivered to the processor until the prescribed pressure and temperature conditions are met. Steam flow is continued as needed in order to maintain temperature and pressure at the prescribed levels for approximately 20 minutes. During this phase, the valve connecting the processor vessel and energy recovery vessel remains open so that as steam condenses and/or water is extracted from the coal, the liquid can drain into the energy recovery vessel.

Steam flow to the processor vessel is stopped. The valve connecting the processor vessel to the energy recovery vessel is closed. Compressed air flow to the processor vessel is opened and set to maintain the current pressure level in the vessel.

Cooling water, drawn from a tank in the water recycling system, is sent to the vessel and sprayed onto the coal to initiate cool-down. Cooling water, steam condensate, and any residual surface moisture washed from the coal are retained within the sealed processor vessel. This phase continues until the coal temperature is lowered to 100° F.

A valve connecting the processor vessel to a tank in the water recycling system is opened and the liquid drained from the vessel to the tank. After clearing the vessel of liquid, the valve is closed. A vent in the processor vessel is opened to allow the pressure level to drop to atmospheric conditions.

The processor vessel door is opened and the coal handling trolley(s) are rolled out of the vessel. Trolleys travel by monorail to the trolley unloading station where the coal is unloaded to belt conveyors.

Coal is conveyed to the centrifuge and processed. The centrifuge removes excess surface moisture from the coal. The moisture removed from the coal is piped to the water recycling system.

Coal is conveyed to the product coating station, where the coal is coated with dust suppressant/anti-oxidant/fire retardant foam. Coal is conveyed to the finished product storage and blending facility.

Example 4

The following table illustrates some assumptions made for certain calculations and simulations relating to certain of the examples disclosed herein, including examples 1 and 2:

| Description and Unit | Value |
|---|---|
| Density of steel, lb/ft$^3$ | 488 |
| Vessel shell and ends thickness, inches | 1 |
| Specific heat of steel, BTU/(lb-° F.) | 0.1 |
| Specific heat of coal, BTU/(lb-° F.) (assumed dry) | 0.33 |
| Radiation and free convection loss from insulated vessel, Btu/hr-ft$^2$ | 50 |
| Specific heat of water, Btu/(lb-° F.) | 1.0 |
| Energy required to reduce internal moisture in coal in step 4 (given), BTU/lb | 34 |
| Vessels are insulated, inches | 6 |
| When cooling vessel, the radiation loss from vessel, Btu · hr/ft$^2$ | 50 |
| The vessel equilibrium temperature at coal discharge, ° F. | 300 |
| Vessel Discharge enthalpy at 105 psia at 200° F. located directly downstream of the heat exchanger to preheat feedwater, BTU/lb | 168.31 |
| Boiler Duty Added, BTU/lb | 1,063.62 |
| Boiler Efficiency, percent | 85 |
| Duty associated with compressor or pump work not accounted for | |
| Coal density, lbs/ft$^3$ | 50 |
| No condensation occurs when vent tank venting into process vessel | |

Example 5

The following tables illustrated certain exemplary aspects of the methods, systems, and apparatuses disclosed herein. The following table illustrates certain exemplary aspects of an energy recovery vessel:

| Description | Value | Unit |
|---|---|---|
| Vessel is 4' diameter, 35' long, 1" thick | | |
| Shell weight | 18,259 | lbs |
| Outer diameter | 4.167 | feet |
| Inner diameter | 4 | feet |
| Length | 35 | feet |
| Density (of steel) | 488 | lb/ft$^3$ |
| Spherical end caps weight | 2,087 | lbs |
| Number of caps | 2 | |
| Total vent Vessel Weight | 20,345 | lbs |
| Outside surface area of vessel (insulated) | 513 | ft$^2$ |
| Outside surface area of end caps (insulated) | 68 | ft$^2$ |
| Total outside area | 582 | ft$^2$ |
| Tank volume | 1,793 | ft$^3$ |

The following table illustrates certain exemplary aspects of a processor:

| Description | Value | Unit |
|---|---|---|
| Vessel is 96" diameter, 70' long, 1" thick | 1 | |
| Shell weight | 72,290 | lbs |
| Outer diameter | 8.167 | feet |
| Inner diameter | 8 | feet |
| Length | 70 | feet |
| Density (of steel) | 488 | lb/ft$^3$ |
| Spherical end caps weight | 4,131 | lbs |
| Number of caps | 2 | |
| Internals (given) | 600 | lbs |
| Total processing vessel weight | 77,021 | lbs |
| Outside surface area of vessel (insulated) | 1,906 | ft$^2$ |
| Outside surface area of end caps (insulated) | 236 | ft$^2$ |
| Total outside area | 2,142 | ft$^2$ |
| Tank volume (empty) | 14,342 | ft$^3$ |
| Tank volume (charged with coal) | 12,842 | ft$^3$ |

The following table illustrates certain exemplary aspects of the trolleys and baskets:

| Description | Value | Unit |
|---|---|---|
| Baskets & Trolley weight 2,500 lbs each | | |
| Total weight of 6 trolleys in one batch | 15,000 | lbs |

The following table illustrates certain exemplary aspects of the processing of carbonaceous material comprising coal:

| Description | Value | Unit |
|---|---|---|
| Each basket has 1.25 tons of coal | | |
| Basket | 2,500 | lbs |
| Number of baskets per trolley | 5 | |
| Number of trolleys per batch | 6 | |
| Total coal weight per batch | 75,000 | lbs |
| Starting vent tank conditions are at 500 psig, saturated liquid, assumed half full, then allowed to expand into the process vessel with the coal charge. | 805.68 | ft$^3$ |
| With this volume of water allowed to expand, the equilibrium pressure is calculated | 13,829.53 | ft$^3$ |
| Quality (Q = f(P) at given hf (original P & T)) | 0.170 | quality |
| Weight of water evaporated | 3,368.50 | lbs |
| vg at Pressure | 4.231 | ft$^3$/lb |
| Calculated volume occupied by evaporated steam | 14,252.13 | ft$^3$ |
| Percent difference between calculated and available volume | (3.06) | % |

-continued

| Description | Value | Unit |
|---|---|---|
| Weight of Water Drained from Vent Tank | 37,322.19 | lbs |
| Heat captured by heat exchanger | 4,902,860 | BTU |

Example 6

In order to evaluate the effect of processing conditions in a bench scale processor, a series of test cases are conducted, each exhibiting a unique combination of pressure, temperature, and time. The overall range of conditions is based, in part, on an understanding of the physical processes and the capabilities of the equipment.

Pressures are tested in the range from 500 psig to 700 psig. Temperatures are tested in the range from 467° F. to 503° F. Processing time is tested in the range from 15 minutes to 25 minutes. The maximum particle size of carbonaceous material tested is 0.75 inches. The minimum particle size of carbonaceous material tested is 0.125 inches. The following table illustrates specific conditions that are tested.

| Case # | Steam Pressure (psig) | Steam Temperature (° F.) | Processing Time (min) |
|---|---|---|---|
| 1 | 500 | 467.1 | 15 |
| 2 |  |  | 20 |
| 3 |  |  | 25 |
| 4 | 550 | 477.1 | 15 |
| 5 |  |  | 20 |
| 6 |  |  | 25 |
| 7 | 600 | 486.3 | 15 |
| 8 |  |  | 20 |
| 9 |  |  | 25 |
| 10 | 650 | 495.0 | 15 |
| 11 |  |  | 20 |
| 12 |  |  | 25 |
| 13 | 700 | 503.2 | 15 |
| 14 |  |  | 20 |
| 15 |  |  | 25 |

Processing time is the length of time that the coal is sustained at the specified pressure and temperature. Additional time is required to bring the vessel and contents up to processing conditions. Thermocouples and pressure transducers within the vessel and coal bed signal when the required conditions have been reached.

Example 7

At the bench scale, testing to measure the efficiency of the preheat station is performed independently of the test cases above. At the bench scale, tests are not assumed to happen in rapid succession, therefore the process water will have significantly cooled down by the time the next preheat is performed. Accordingly, the bench scale includes an immersible heater to reheat the process water to the temperature recorded when draining the vessel.

In the preheat chamber, the water is sprayed over the coal baskets and caught in a basin. The total volume of water available is a fixed amount based on the quantity drained from the vessel after processing and cool-down. The preheat water is recycled from the basin and re-sprayed as required based on the preheat time prescribed for the test. The purpose of the test is to measure the coal bed temperature at 30-second intervals for a maximum preheat time of 30 minutes.

Example 8

Testing is performed to measure the weight and bed temperature of the material just prior to, and just after completing the drying by centrifuge. The surface moisture (and incidental solids) removed by the centrifuge are captured. The data collected permits the surface moisture reduction and temperature loss to be established.

Example 9

In the manual bench scale process, one interest in material handling design is in the specific size and configuration of the baskets and trolleys used to contain the coal in the vessel. In order to promote the highest degree of steam and cooling water saturation of the coal bed, the outer walls of the baskets are constructed of steel mesh with openings sized to the minimum coal particles (⅛ inch), and the top of the baskets are open. The baskets are arranged in the trolley allowing gaps between baskets of approximately 1 inch to permit steam saturation.

Testing of the basket and trolley design is conducted by varying the spacing between baskets to permit a better flow of steam to the coal bed. Independent from the above processing tests, a bed permeability experiment is conducted to measure the rate at which water flows through the coal bed within a trolley basket. This provides a measure of the efficiency of the design regarding the ability to shed liquid as it is extracted from the coal during processing.

Example 10

The bench scale system incorporates a PLC-based data acquisition system including thermocouples, pressure transducers and liquid level sensors to record data at prescribed intervals during the process. An industrial hanging scale is also be used. The following test data is recorded at various points in the process:

| Process Point | Test Data Recorded | Data Frequency |
|---|---|---|
| During Preheat | Preheat water temperature and coal bed temperature | 30-second intervals |
| Prior to Centrifuge | Gross weight of coal baskets | Single measurement |
| Centrifuge | Weight and volume of water collected | Single measurement |
| After Centrifuge | Gross weight of coal baskets | Single measurement |
| Pressure Vessel | Pressure in the vessel, temperature in the vessel, temperature in the coal bed, and water level in the vessel | 30-second intervals |
| After Pressure Vessel | Weight, volume, and temperature of process water. Gross weight of baskets. | Single measurement |
| Centrifuge | Weight and volume of water collected | Single measurement |
| After Centrifuge | Gross weight of baskets | Single measurement |

Temperatures of the coal bed within the preheat chamber and inside the vessel are measured by thermocouples strategically placed within the coal bed.

Example 11

The bench scale process of this example need not include coal preparation equipment that may be part of a full scale implementation. Accordingly, the feedstock processed in the bench scale is prepared by a third party provider to meet the following specifications: crushed to a maximum particle size of 0.75 inches; screened to a minimum particle size of 0.125 inches; and air jigged to reduce mineral content and other foreign matter. The resultant feedstock is sent to Standard Laboratories, Inc., in West Virginia, for analysis. Separate batches, if required, are segregated in storage. Each trolley and basket are uniquely identified and weighed to establish tare weight.

The standard procedure for conducting test cases includes the following activities:

1. Load four baskets for one test case. Record gross weight of individual baskets.
2. Load baskets into preheat chamber.
3. Initiate preheat spray. Record water temperature and coal bed temperature at 30-second intervals. Record the final coal bed temperature just prior to removal.
4. Remove baskets from preheat chamber and record gross weight.
5. Empty baskets into centrifuge and operate centrifuge. Record weight and volume of surface moisture removed.
6. Centrifuge empties into basket(s). Record the gross weight of the baskets.
7. Load baskets into a trolley and load trolley into the vessel. Send steam to the vessel. Record steam pressure and temperature at the boiler, temperature, pressure & liquid level in the vessel, and temperature in the coal bed at 30-second intervals during vessel heat up and sustained temperature phases.
8. Record "final" temperature, pressure and liquid level in the vessel, and temperature in the coal bed prior to initiating cool-down phase.
9. Initiate vessel cool-down by opening cooling spray valves and compressed air valve. Record temperature, pressure and liquid level in the vessel, and temperature in the coal bed at 30-second intervals during cool-down, terminating when the maximum coal bed temperature reaches 140° F. Release pressure from the vessel and open the hatch.
10. Remove trolley from vessel and remove baskets from trolley. Record the gross weight of the baskets.
11. Empty baskets into centrifuge and operate centrifuge. Record weight and volume of surface moisture removed.
12. Centrifuge empties into basket(s). Record the gross weight of the baskets.
13. Apply dust suppressant foam to processed coal and store coal in segregated storage.

Samples of the processed coal are sent to Standard Labs for analysis within 1 day of processing. A second sample is sent for analysis after one week in ambient conditions to confirm that moisture has not been re-absorbed.

Example 13

Data analysis is conducted on two levels: technical and economic. On the technical side, the test data is used to confirm that the processor was effective in reducing the moisture content of the coal. Furthermore, the results of various test cases performed at varying temperature, pressure and time conditions are analyzed to determine what cause and effect relationships exist between varying conditions and the resultant coal properties.

Test data is also used to refine the computer-based process model of the methods and systems. Further refinement of this model makes it a more reliable predictor of carbonaceous material properties for conditions not specifically tested during the bench scale.

On the economic side, test data is used to determine the heating value, and therefore the economic value of the product that can be produced. Results also yield information relating to the direct capacity of the bench scale model and more reliable estimates of the full scale processor capacity.

Based on these findings, the capital expenditures and operating costs are estimated for a full scale plant and subjected to standard financial analysis to establish the economic feasibility of the process.

What is claimed:

1. A method, comprising:
reducing the water content in a carbonaceous material by heating the carbonaceous material with steam at superatmospheric pressure; and
cooling the carbonaceous material with water to a temperature of less than about 212° F. while controlling the pressure of the carbonaceous material at superatmospheric pressure.

2. The method of claim 1, further comprising pre-heating the carbonaceous material prior to heating the carbonaceous material with steam.

3. The method of claim 2, wherein the pre-heating is accomplished with a medium comprising a liquid.

4. The method of claim 3, wherein the liquid comprises water.

5. The method of claim 4, wherein the liquid further comprises hydrogen peroxide.

6. The method of claim 3, wherein the liquid comprises hydrocarbons.

7. The method of claim 1, wherein the pressure of the carbonaceous material is essentially unchanged while the carbonaceous material is cooled.

8. The method of claim 1, wherein the pressure of the carbonaceous material is gradually decreased while the carbonaceous material is cooled.

9. The method of claim 3, wherein the pressure of the carbonaceous material is essentially unchanged while the carbonaceous material is cooled.

10. The method of claim 1, wherein the carbonaceous material comprises coal.

11. The method of claim 1, wherein the carbonaceous material comprises bituminous coal.

12. The method of claim 1, wherein the carbonaceous material comprises subbituminous coal.

13. The method of claim 1, wherein the carbonaceous material comprises lignite.

14. The method of claim 1, wherein the carbonaceous material comprises anthracite.

15. The method of claim 1, wherein the carbonaceous material comprises peat.

16. The method of claim 1, wherein the carbonaceous material comprises biomass.

17. The method of claim 1, wherein the carbonaceous material comprises petroleum coke.

18. The method of claim 1, wherein the carbonaceous material comprises carbonaceous waste products.

19. The method of claim 1, wherein the steam is saturated steam.

20. The method of claim 1, wherein the steam is superheated steam.

21. The method of claim 1, wherein the carbonaceous material is heated with steam to a temperature of at least about 250° F.

22. The method of claim 1, wherein the carbonaceous material is heated with steam to a temperature of at least about 400° F.

23. The method of claim 1, wherein the carbonaceous material is heated with steam to a temperature of at most about 1000° F.

24. The method of claim 1, wherein the carbonaceous material is heated with steam to a temperature in the range from about 250° F. to about 1000° F.

25. The method of claim 1, wherein the carbonaceous material is heated with steam to a temperature in the range from about 400° F. to about 750° F.

26. The method of claim 1, wherein the carbonaceous material is heated with steam to a temperature in the range from about 440° F. to about 550° F.

27. The method of claim 1, wherein the pressure of the carbonaceous material is essentially unchanged during the heating with steam.

28. The method of claim 1, wherein the pressure of the carbonaceous material is increased during the heating with steam.

29. The method of claim 1, wherein the carbonaceous material is heated with steam having a pressure of at least about 15 psig.

30. The method of claim 1, wherein the carbonaceous material is heated with steam having a pressure of at least about 250 psig.

31. The method of claim 1, wherein the carbonaceous material is heated with steam having a pressure of at most about 1000 psig.

32. The method of claim 1, wherein the carbonaceous material is heated with steam having a pressure in the range from about 15 psig to about 1000 psig.

33. The method of claim 1, wherein the carbonaceous material is heated with steam having a pressure in the range from about 400 psig to about 750 psig.

34. The method of claim 1, wherein the carbonaceous material is heated with steam having a pressure in the range from about 500 psig to about 700 psig.

35. The method of claim 1, wherein the carbonaceous material is heated with steam for a time in the range from about 10 minutes to about 60 minutes.

36. The method of claim 1, wherein the carbonaceous material is heated with steam for a time in the range from about 15 minutes to about 25 minutes.

37. The method of claim 1, wherein, while cooling, the pressure of the carbonaceous material is controlled by a gas.

38. The method of claim 37, wherein the gas comprises air.

39. The method of claim 37, wherein the gas is an inert gas.

40. The method of claim 37, wherein the gas comprises nitrogen and hydrogen.

41. The method of claim 37, wherein the gas comprises nitrogen.

42. The method of claim 37, wherein the gas comprises nitrogen, oxygen, and hydrogen.

43. The method of claim 1, wherein the carbonaceous material is cooled by spraying the carbonaceous material with water.

44. The method of claim 3, wherein, while cooling, the pressure of the carbonaceous material is controlled by a gas.

45. The method of claim 4, wherein, while cooling, the pressure of the carbonaceous material is controlled by a gas.

46. The method of claim 44, wherein the gas is air.

47. The method of claim 45, wherein the gas is air.

48. The method of claim 47, wherein the carbonaceous material is heated with steam to a pressure in the range from about 400 psig to about 750 psig.

49. The method of claim 48, wherein the carbonaceous material is heated with steam to a pressure in the range from about 400° F. to about 750° F.

50. The method of claim 49, wherein the carbonaceous material is heated with steam for a time in the range from about 10 minutes to about 60 minutes.

51. The method of claim 50, wherein the carbonaceous is cooled with water by spraying the carbonaceous material with water.

52. The method of claim 51, wherein the carbonaceous material is subbituminous coal.

53. The method of claim 1, further comprising combusting the upgraded carbonaceous material to generate heat.

54. The method of claim 53, further comprising generating steam using the heat.

55. The method of claim 54, further comprising turning a turbine with the steam.

56. The method of claim 55, further comprising turning a generator, connected to the turbine, to generate electricity.

57. A composition comprising carbonaceous material treated according to the method of claim 1.

58. A composition comprising subbituminous coal treated according to the method of claim 52.

* * * * *